United States Patent
Barros et al.

(10) Patent No.: US 11,994,255 B2
(45) Date of Patent: May 28, 2024

(54) ADJUSTABLE AND STOWABLE WORKSTATION ASSEMBLY

(71) Applicant: Ergotron, Inc., St. Paul, MN (US)

(72) Inventors: Michael P. Barros, Minnetonka, MN (US); Thiem Chan Duong Wong, Brooklyn Park, MN (US); Linnea Londborg, Minneapolis, MN (US); Andrew P. Laureijs, Saint Paul, MN (US); John William Theis, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 18/276,515

(22) PCT Filed: Nov. 16, 2022

(86) PCT No.: PCT/US2022/079953
§ 371 (c)(1),
(2) Date: Aug. 9, 2023

(87) PCT Pub. No.: WO2023/122398
PCT Pub. Date: Jun. 29, 2023

(65) Prior Publication Data
US 2024/0093830 A1    Mar. 21, 2024

Related U.S. Application Data
(60) Provisional application No. 63/292,972, filed on Dec. 22, 2021.

(51) Int. Cl.
*F16M 13/02* (2006.01)
*F16M 11/04* (2006.01)
(Continued)

(52) U.S. Cl.
CPC ........ *F16M 13/022* (2013.01); *F16M 11/046* (2013.01); *F16M 11/08* (2013.01);
(Continued)

(58) Field of Classification Search
CPC ...... F16M 13/02; F16M 11/046; F16M 11/08; F16M 11/2014; F16M 11/24;
(Continued)

(56) References Cited

U.S. PATENT DOCUMENTS

| | | | | |
|---|---|---|---|---|
| 5,799,917 A | * | 9/1998 | Li | F16M 13/022 248/921 |
| 10,323,791 B1 | * | 6/2019 | Liu | F16B 2/065 |

(Continued)

FOREIGN PATENT DOCUMENTS

| | | |
|---|---|---|
| CN | 117082998 | 11/2023 |
| WO | WO-2021262544 A1 | 12/2021 |
| WO | WO-2023122398 A1 | 6/2023 |

OTHER PUBLICATIONS

"International Application Serial No. PCT/US2022/079953, International Search Report dated Feb. 15, 2023", 2 pgs.

(Continued)

*Primary Examiner* — Todd M Epps
(74) *Attorney, Agent, or Firm* — Schwegman Lundberg & Woessner, P.A.

(57) ABSTRACT

A workstation holding one or more electronic devices, e.g., a display, keyboard, or the like, can be mounted on a structure, e.g., a wall, using an articulating arm assembly including one or more arms. The one or more arms can be rotatingly coupled to the structure on one end and a work surface can be coupled to the other end. At least one of the one or more arms can be height adjustable. The workstation can rotate about a horizontal axis between a use configuration and a storage configuration. The one or more arms can (Continued)

be configured to translate the workstation between a contracted orientation and extended orientation. The height adjustable arm can include a counterbalance mechanism to counter a weight of the one or more components coupled to the workstation. A tension of the one or more springs contained in the counterbalance mechanism can be adjustable.

11 Claims, 10 Drawing Sheets

(51) Int. Cl.
   *F16M 11/08* (2006.01)
   *F16M 11/20* (2006.01)
   *F16M 11/24* (2006.01)
(52) U.S. Cl.
   CPC ......... *F16M 11/2014* (2013.01); *F16M 11/24* (2013.01); *F16M 2200/024* (2013.01); *F16M 2200/044* (2013.01); *F16M 2200/068* (2013.01)
(58) Field of Classification Search
   CPC ....... F16M 2200/024; F16M 2200/044; F16M 2200/068

USPC .................................................. 248/280.11
   See application file for complete search history.

(56) References Cited

U.S. PATENT DOCUMENTS

| | | | |
|---|---|---|---|
| 2005/0022699 A1* | 2/2005 | Goza ................. | A47B 21/0314 108/50.01 |
| 2007/0040084 A1 | 2/2007 | Sturman et al. | |
| 2007/0153459 A1 | 7/2007 | Wohlford et al. | |
| 2013/0271939 A1* | 10/2013 | De Jong ................ | F16M 11/10 361/809 |
| 2016/0367027 A1 | 12/2016 | Voigt et al. | |
| 2018/0020825 A1* | 1/2018 | Hung ................. | F16M 11/2014 108/31 |
| 2019/0061639 A1 | 2/2019 | Fischer et al. | |
| 2019/0374025 A1 | 12/2019 | Bowman | |

OTHER PUBLICATIONS

"International Application Serial No. PCT/US2022/079953, Written Opinion dated Feb. 15, 2023", 7 pgs.
"Canadian Application Serial No. 3,207,945, Voluntary Amendment Filed Aug. 9, 2023", 7 pgs.

* cited by examiner

ADJUSTABLE AND STOWABLE WORKSTATION ASSEMBLY

CLAIM OF PRIORITY

This patent application is a U.S. NSPCT of PCT Application Serial No. PCT/US2022/079953, entitled "ADJUSTABLE AND STOWABLE WORKSTATION ASSEMBLY," filed Nov. 16, 2022, and published as WO 2023/122398 on Jun. 29, 2023, which claims the benefit of priority of Barros, et al. U.S. Provisional Patent Application Ser. No. 63/292,972, entitled "ADJUSTABLE AND STOWABLE WORKSTATION ASSEMBLY," filed on Dec. 22, 2021, which are hereby incorporated by reference herein in their entirety.

TECHNICAL FIELD

This document pertains generally, but not by way of limitation, to a workstation having a keyboard tray and a display mount coupled to a structure, more specifically an articulating arm assembly for adjusting the position of the workstation relative to the structure.

BACKGROUND

Workstations holding one or more electronic equipment (e.g., one or more displays, an input device, or the like) are commonly used in modern offices, hospitals, industrial facilities, or other places. A workstation can include an articulating arm assembly, a worksurface/keyboard tray assembly, and a display mount assembly. The workstation can be mounted on a structure (e.g., a wall, a desk, or the like). The arm assembly can provide either height adjustment or articulation or both for the electronic equipment coupled to the workstation. A user of the workstation can easily adjust an orientation of the electronic equipment to fit changing posture of the user throughout the day using the arm assembly.

In order to reduce the space occupied by the workstation when it is not in active use, the workstation can be generally stored in a stowed orientation where the arm assembly can be collapsed close to the mounting location on the structure, and the worksurface/keyboard tray assembly can be folded towards the mounting location. During the use of the workstation, the display and the input device can be pulled away from the mounting location in an extended orientation. In the extended orientation, the workstation can be more accessible, and it can allow the user to interact with user's environment (e.g., to interact with a patient in a hospital room, or the like). A workstation that can be easily manipulated between the stowed orientation and the extended orientation will improve user satisfaction, and it will be adjusted more frequently to provide a better ergonomic positioning for the user.

BRIEF DESCRIPTION OF THE DRAWINGS

The following drawings are illustrative of embodiments of the present invention and therefore do not limit the scope of the invention. The drawings are not to scale and are intended for use in conjunction with the explanations in the following detailed description. Like numerals may describe similar components in different views. Like numerals having different letter suffixes may represent different instances of similar components. The drawings illustrate generally, by way of example, but not by way of limitation, various embodiments discussed in the present document.

OVERVIEW

This disclosure describes a workstation having an articulating arm assembly to support one or more electronic devices including, but not limited to, electronic displays, keyboards, laptops and other computing equipment, medical equipment, scanners, and the like. The workstation can be mounted on a structure including any fixed or mobile support surface (e.g., a wall, a desk, a pole, a cart, or the like). The articulating arm assembly can allow the workstation to translate between a range of positions between stowed and extended orientations.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
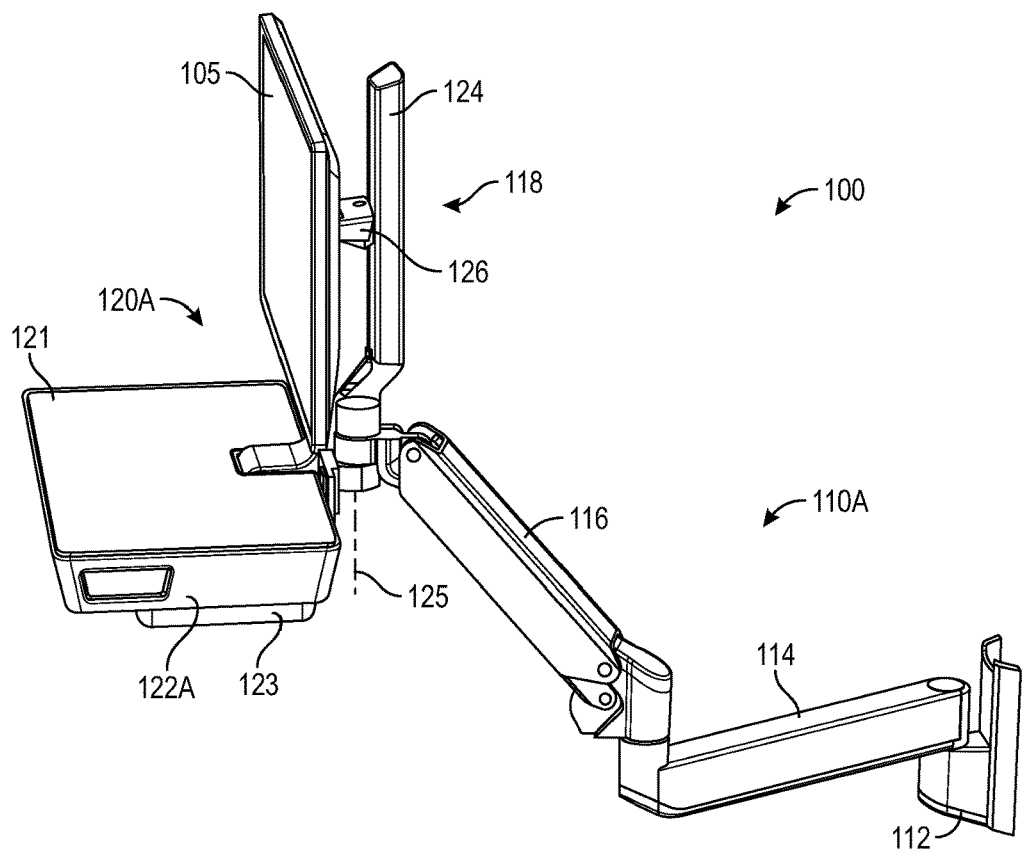
FIG. 1 is an isometric view of an example of a workstation having an arm assembly in an extended orientation.
Figure 2:
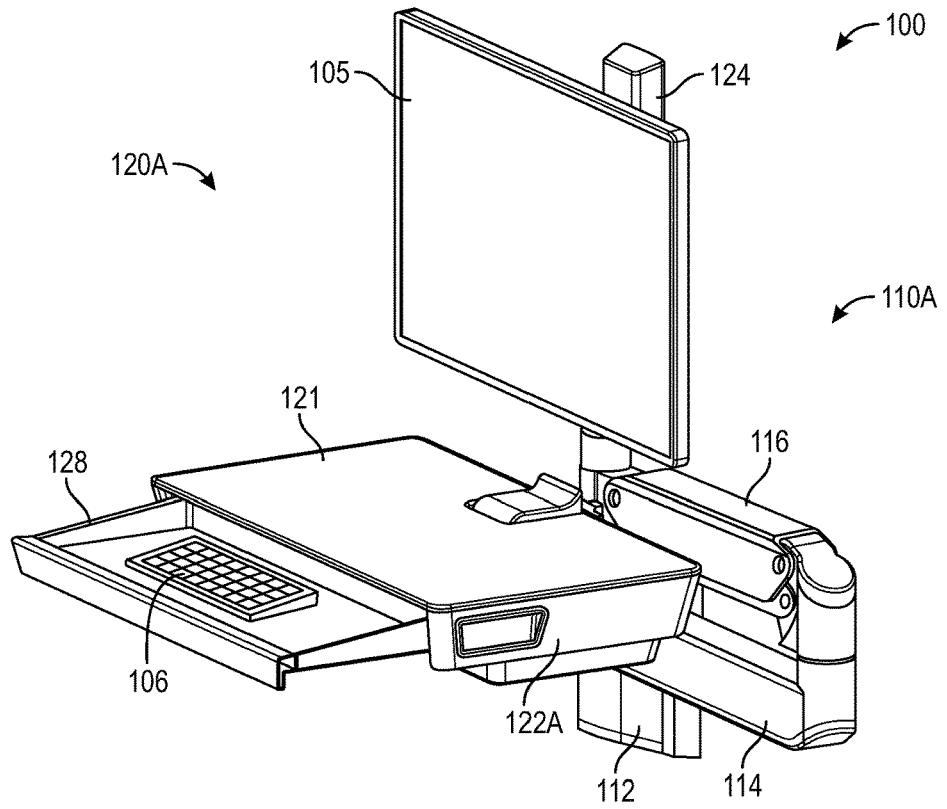
FIG. 2 is an isometric view of the workstation of FIG. 1 in a stowed orientation.

FIGS. 1-2 are isometric views of a workstation 100 including an arm assembly (e.g., the arm assembly 110A of FIG. 1) in an extended orientation and in a stowed orientation, respectively, according to some example configurations of the current disclosure. The arm assembly 110A can be coupled to a structure interface 112 on one end, and a mount assembly 120A can be coupled to the arm assembly 110A on the other end. The arm assembly 110A can be configured to translate the mount assembly 120A relative to the structure interface 112. In some example configurations, the arm assembly 110A can include a first arm 114 (e.g., an extension arm) and a second arm 116 rotatingly coupled to the first arm 114. The arm assembly 110A can translate the mount assembly 120A relative to the structure interface 112. In some example configurations, the first arm 114 and the second arm 116 can be configured to cooperate to translate the mount assembly in a horizontal direction between the extended orientation and the stowed orientation. In some example configurations, the second arm 116 can be height adjustable. The second arm 116 can translate the mount assembly in a vertical direction relative to the structure interface 112.

The structure interface 112 can be mounted on a fixed or mobile structure (e.g., a wall, a desk, a cart, a pole, or the like). In some example configurations, the structure interface 112 can include an interface bracket. The interface bracket can be directly mounted on a structure. In other configurations, the structure interface 112 can include an interface assembly. The interface assembly can include one or more components to mount the arm assembly 110A on a structure. For example, the interface assembly can include an interface bracket and a wall track. The wall track can be mounted on a wall, and the interface bracket can be coupled to the wall track.

In some example configurations, the mount assembly 120A can include a display interface 118 and a support tray (e.g., the support tray 122A of FIGS. 1-2). The display interface 118 and the support tray 122A can be rotatingly coupled to the arm assembly 110A about a vertical axis 125. In some example configurations, a rotation of the support tray 122A can force a rotation of the display interface 118, whereas the display interface 118 can be capable of rotating independent of the support tray 122A. The display interface 118 can further include a support column 124 and a tilt assembly 126 coupled to the support column 124.

The tilt assembly 126 can include a display interface bracket. The display interface bracket can be adapted to be coupled to an electronic display 105. The display interface 118 can be configured to hold an electronic display 105 above the support tray 122A, and the display interface 118 can be configured to change an orientation of the electronic display 105 relative to the support tray 122A (e.g., change a distance or angle of the electronic display 105 relative to the support tray 122A).

In some example configurations, a worksurface 121 can be coupled to the support tray 122A. The user of the workstation 100 can place personal equipment (e.g., papers, a notebook, a calculator, one or more pens, or the like) on the worksurface 121. In some example configurations, a keyboard can be placed over the worksurface 121.

In other example configurations, a slide out tray 128 (e.g., a keyboard tray) can be coupled to the support tray 122A as illustrated in FIG. 2. The slide out tray 128 can be configured to hold an input device (e.g., a keyboard 106) which can be placed over the slide out tray 128. The slide out tray 128 can translate between a stowed orientation of where the keyboard 106 can be stowed under the worksurface 121 and an extended orientation where the slide out tray 128 can be pulled out (e.g., to locate it in front of the worksurface 121) to make the keyboard 106 accessible as illustrated in FIG. 2. In some example configurations, the slide out tray 128 can be used as a drawer to store personal items.

In some example configurations, a storage compartment 123 can be coupled to the support tray 122A as illustrated in FIG. 1. The storage compartment 123 can be a separate component, and it can be secured to an underside of the support tray 122A using one or more mechanical fasteners (screws, rivets, clamps, notches, latches, or the like). In other example configurations, the storage compartment 123 can be formed as part of the support tray 122A. The storage compartment 123 can be used to store one or more electronic components including, but not limited to, a computer (e.g., a fat, thin, or zero client), a charging adaptor, one or more cables, or the like.

Figure 3:
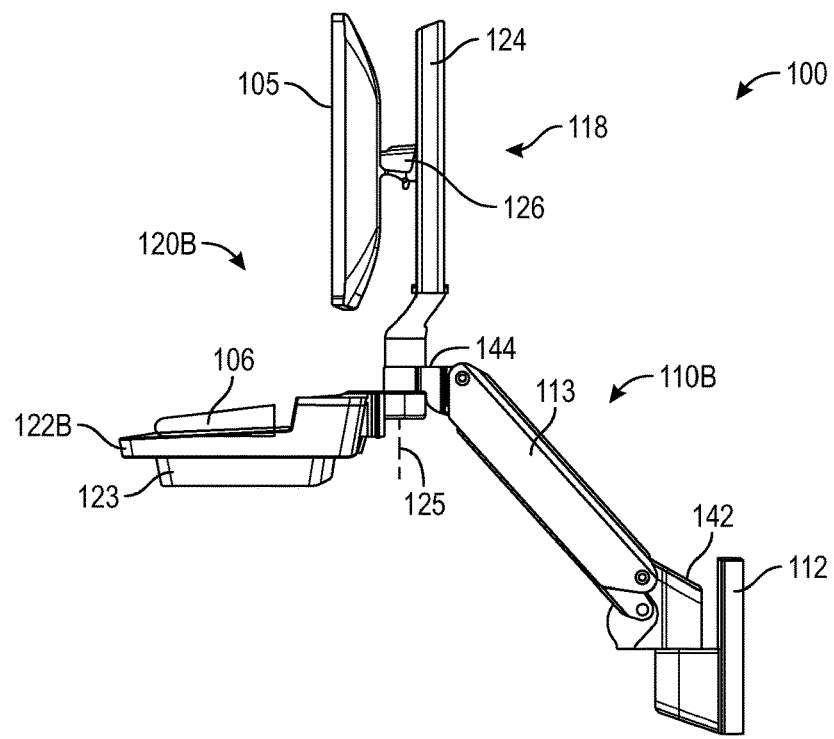
FIG. 3 is a side view of an example of a workstation having a single height adjustable arm.

FIG. 3 is a side view of a workstation 100 according to an example configuration of the current disclosure. The workstation 100 can include an arm assembly 110B. The arm assembly 110B can include a single arm (e.g., a height adjustable arm 113) where the height adjustable arm 113 can be similar to the second arm 116 of FIG. 1. The arm assembly 110B can have a first end 142 and a second end 144. The arm assembly 110B can be rotatingly coupled to a structure interface 112 on the first end 142, and a mount assembly 120B can be rotatingly coupled to the second end 144 of the arm assembly 110B about a vertical axis 125. The mount assembly 120B can further include a support tray 122B and a display interface 118. In some example configurations, a rotation of the support tray 122A can force a rotation of the display interface 118, whereas the display interface 118 can be capable of rotating independent of the support tray 122A.

The display interface 118 can be configured to hold an electronic display 105 over the support tray 122B. An input device (e.g., a keyboard 106) can be located over the support tray 122B. The arm assembly 110B can be used to change an orientation (e.g., vertical orientation, horizontal orientation, or both) of the electronic display 105 and the keyboard 106 relative to the structure interface 112.

Figure 4A:
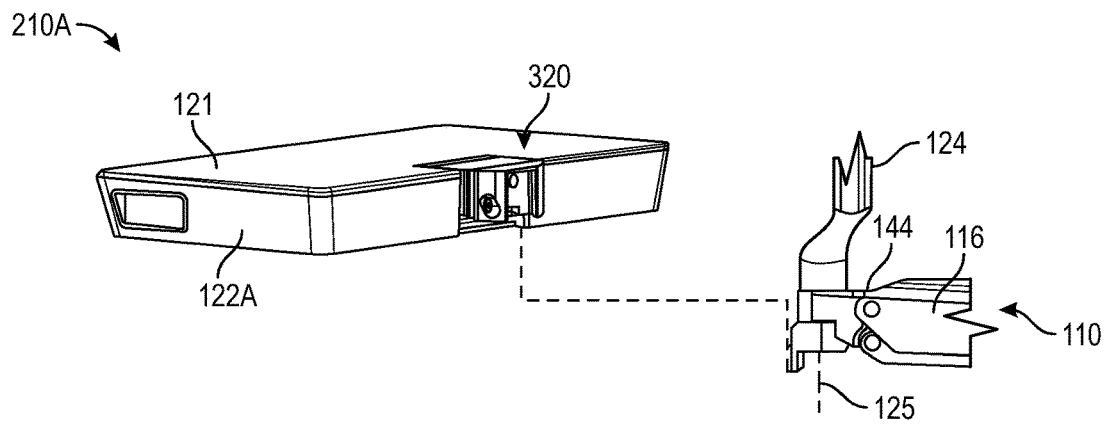
FIG. 4A is a partial exploded view of the platform and the arm assembly of FIGS. 1-2.
Figure 4B:
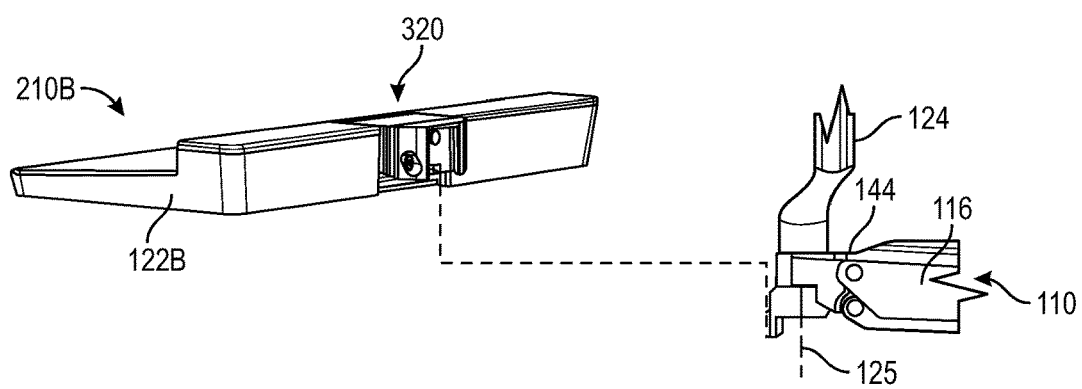
FIG. 4B is a partial exploded view of the platform and the arm assembly of FIGS. 1 and 3.

FIGS. 4A-4B are exploded views of a platform 210 and partial views of an arm assembly 110 according to some example configurations of the current disclosure. The platform 210 can be coupled to an end of an arm assembly 110 (e.g., the second end 144 of the arm assembly 110B of FIG. 3). The platform 210 can be built in different configurations. In some example configurations, the platform 210A can have a worksurface 121 coupled to the support tray 122A as illustrated in FIG. 4A. A keyboard tray (e.g., the slide-out tray 128 of FIG. 2) can be coupled to the support tray 122A below the worksurface 121. In other example configurations, the platform 210B can be built without a worksurface as illustrated in FIG. 4B. A keyboard tray can be built as an integral part of the support tray 122B. In either one of these example configurations, an interface assembly 320 can be coupled to the rear end of the platform 210 proximate to its center. The interface assembly 320 can be configured to quickly couple the platform 210 to the arm assembly 110.

Figure 5:
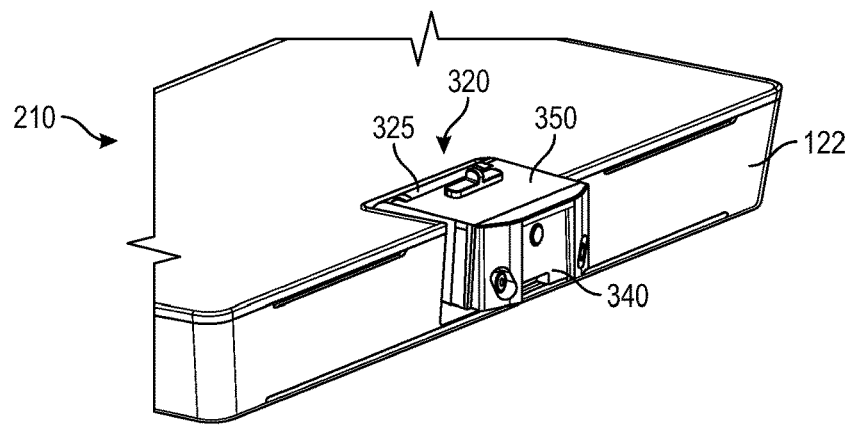
FIG. 5 is an isometric view of the rear end of the platform of FIG. 1.

FIG. 5 is an isometric view of the rear end of a platform 210 (e.g., the platform 210A of FIG. 4A). The interface assembly 320 can include an interface bracket 340 and a carrier block 350. The interface bracket 340 can be coupled to a first end 351 (shown in FIG. 8) of the carrier block 350, and a platform tilt hinge 325 can be located on a second end 352 (shown in FIG. 8) of the carrier block 350. The platform 210 can be rotatingly coupled to the carrier block 350 at the platform tilt hinge 325. The interface bracket 340 can be adapted to releasably couple the carrier block 350 to the arm assembly 110.

Figure 6:
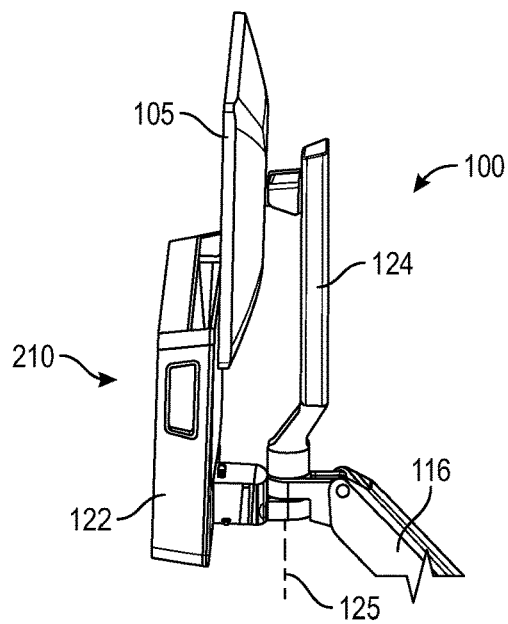
FIG. 6 illustrates the workstation of FIG. 1 in a stowed orientation of the platform.

FIG. 6 is a side perspective view of a stowed orientation of the platform 210 (e.g., the platform 210A of FIG. 4A) according to an example configuration of the current disclosure. The platform tilt hinge 325 can define a horizontal rotation axis 356 (shown in FIG. 8). The platform 210 can be rotated around the horizontal rotation axis 356 in a clockwise direction towards the electronic display 105 to place the platform in a stowed orientation (as illustrated in FIG. 6) when the workstation is not in use. In the stowed orientation, the footprint of the workstation 100 can be reduced to save office space. The platform 210 can be rotated around the horizontal rotation axis 356 in a counterclockwise direction away from the electronic display 105 to place the platform 210 in a use orientation when the workstation 100 is intended to be used by the user of the workstation.

Figure 7:
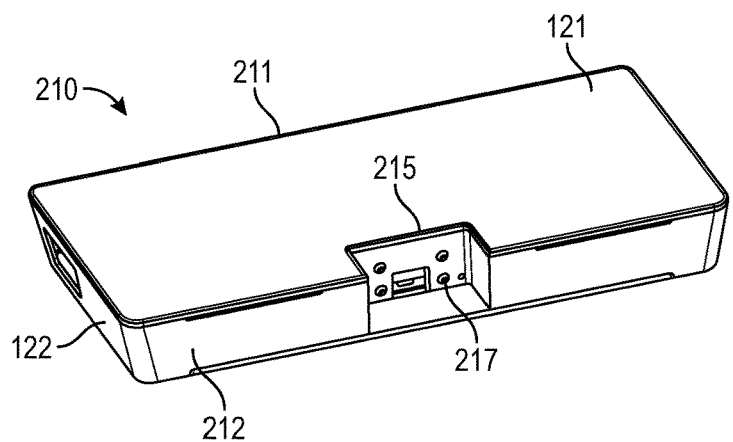
FIG. 7 is a rear isometric view of the platform of FIG. 4A.

FIG. 7 is a rear isometric view of a platform 210 (e.g., the platform 210A of FIG. 4A). The platform 210 can have a front end 211 and a rear end 212 opposite the front end 211. In some example configurations, a recess 215 can be formed on the rear end 212 proximate to its center the recess 215 can be formed on the support tray 122A). The interface assembly 320 can be at least partially located inside the recess 215. One or more apertures 217 can be formed on the recess. The platform 210 can be coupled to the interface assembly 320 through one or more apertures 217.

Figure 8:
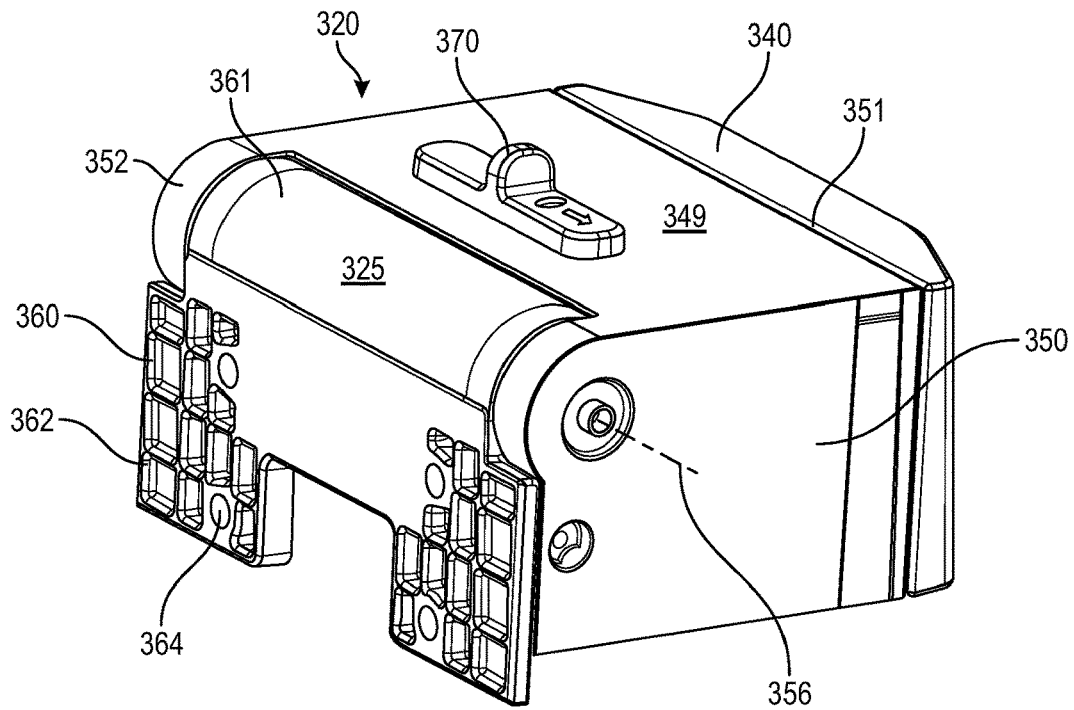
FIG. 8 is an isometric view of example of an interface assembly in a folded orientation.
Figure 9:
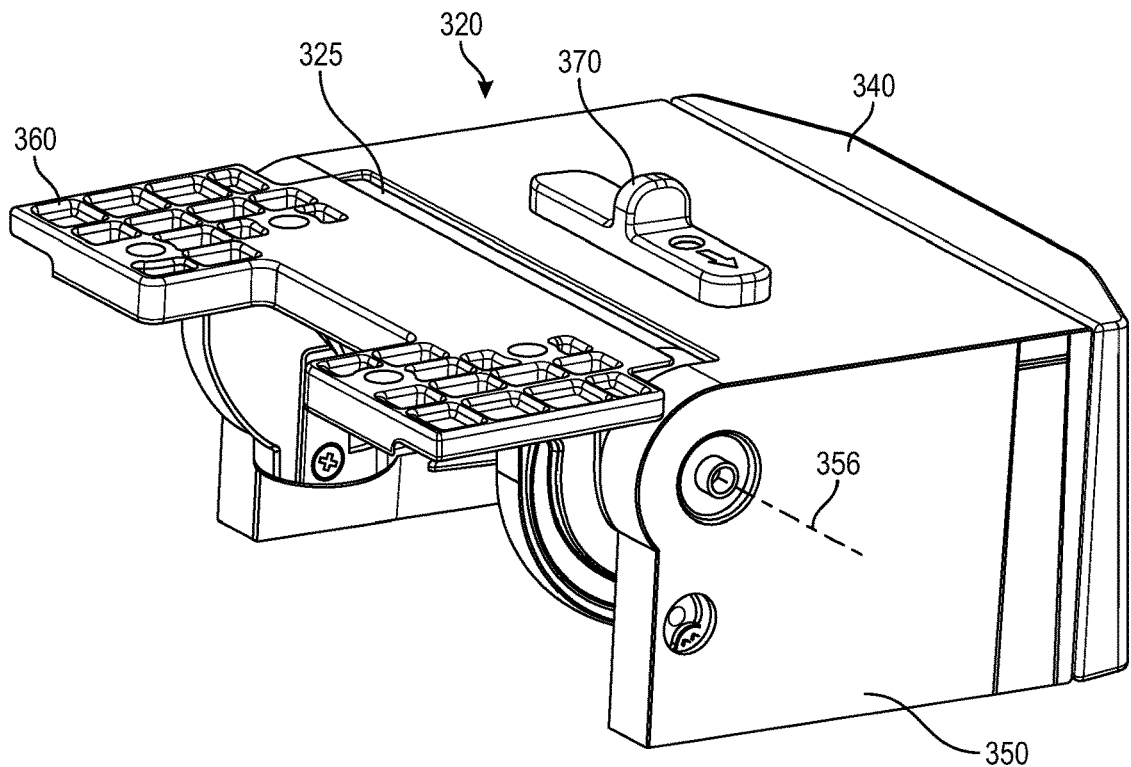
FIG. 9 is an isometric view of the interface assembly of FIG. 8 in an extended orientation.

FIGS. 8-9 are isometric views showing interface assemblies (e.g., the interface assembly 320 of FIG. 5) in a folded orientation and in an extended orientation, respectively, according to example configurations of the current disclosure. The interface assembly 320 can include a carrier block 350, an interface bracket 340, and a hinge bracket 360. In some example configurations, a slider 370 can be coupled to an upper surface 349 of the carrier block 350.

The hinge bracket 360 can have a hinge portion 361 and a flat portion 362. The hinge portion 361 can be rounded. The flat portion 362 can extend from the hinge portion 361 in a transverse direction. One or more threaded holes 364 can be formed on the flat portion 362. The one or more threaded holes 364 can overlap with the one or more apertures 217 when the platform 210 is coupled to the interface assembly 320. One or more mechanical fasteners (e.g., screws, rivets, or the like) can be inserted through the one or more apertures 217 located on the support tray 122 and can engage with the one or more threaded holes 364 located on the hinge bracket 360 to securely couple the support tray 122 to the hinge bracket 360.

The hinge bracket 360 can be rotatingly coupled to the carrier block 350 at the platform tilt hinge 325. The hinge bracket 360 can be adapted to rotate between a folded orientation and an extended orientation. In the folded orientation, the hinge bracket 360 can be folded against the carrier block 350 as illustrated in FIG. 8. In the folded orientation, the hinge bracket 360 can be placed in a downward orientation (e.g., substantially vertical) and it can rest against the second end 352 of the carrier block 350. The hinge bracket 360 can rotate (e.g., rotate 90 degrees, or the like) from the folded orientation to the extended orientation in clockwise direction around the horizontal rotation axis 356. In the extended orientation, the hinge bracket 360 can be placed in a flat orientation (e.g., substantially horizontal) as illustrated in FIG. 9. Since the support tray 122 is coupled to the hinge bracket 360, the support tray 122, and thus, the platform 210 can rotate with the hinge bracket 360 from the use orientation to the stowed orientation as the hinge bracket 360 rotates from the folded orientation to the extended orientation. The folded orientation of the hinge bracket 360 can correspond to the use orientation of the platform 210, and the extended orientation of the hinge bracket 360 can correspond to the stowed orientation of the platform 210.

Figure 10:
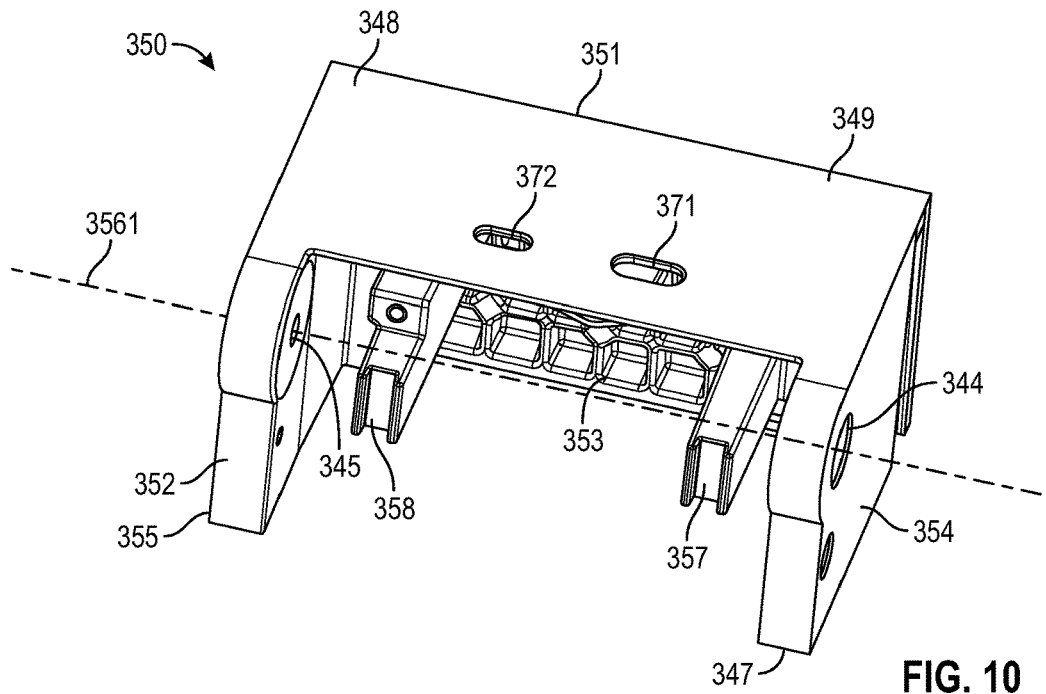
FIG. 10 is an isometric view of example of a carrier block of FIG. 8.

FIG. 10 is an isometric view of the carrier block 350 of FIG. 8. The carrier block 350 can have a first end 351 and a second end 352. A rear wall 353 can be built into the carrier block 350 proximate the first end 351. The carrier block 350 can further include a first side wall 354 and a second side wall 355. The first side wall 354 and the second side wall 355 can extend from the rear wall 353 in transverse direction from the first end 351 to the second end 352 of the carrier block 350. An upper surface 349 can be coupled to the first side wall 354, the second side wall 355 and the rear wall 353 of the carrier block 350 proximate an upper end 348 of the carrier block 350. The second end 352 and a lower end 347 opposite the upper end 348 of the carrier block 350 can be open between the first side wall 354 and the second side wall 355.

In an example configuration, a first spacer 357 and a second spacer 358 can be coupled to the rear wall 353 as illustrated in FIG. 10. The first spacer 357 and the second spacer 358 can extend from the rear wall 353 in transverse direction towards the second end 352. The carrier block 350 can further include a first aperture 371 and a second aperture 372. The first aperture 371 and the second aperture 372 can be elongated holes formed on the upper surface 349.

In an example configuration, a first through hole 344 and a second through hole 345 can be formed on the first side wall 354 and the second side wall 355, respectively. The first through hole 344 and the second through hole 345 can be located proximate to the upper end 348 and proximate to the second end 352. The first through hole 344 and the second through hole 345 can be coaxial. An axis passing through the centers of the first through hole 344 and the second through hole 345 can form a first rotation axis 3561 as illustrated in FIG. 10.

Figure 11:
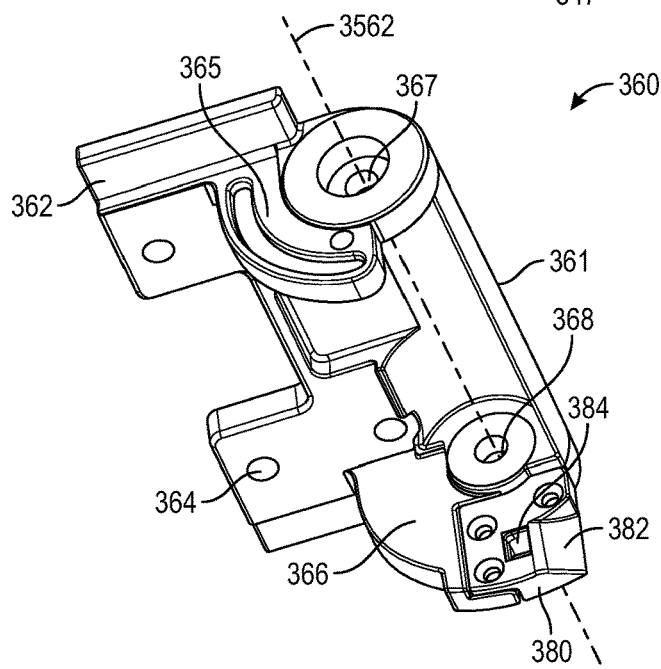
FIG. 11 is an isometric view of an example of a hinge bracket of FIG. 8.

FIG. 11 is an isometric view of the hinge bracket 360 of FIG. 8. The hinge bracket 360 can have a hinge portion 361 and a flat portion 362. A first side wall 365 and a second side wall 366 can be formed on the hinge bracket 360. The first side wall 365 and a second side wall 366 can extend from the flat portion 362 in transverse direction. The first side wall 365 and a second side wall 366 can be proximate to the hinge portion 361. A first through hole 367 and a second through hole 368 can be formed on the first side wall 365 and the second side wall 366, respectively. The first through hole 367 and the second through hole 345 can be coaxial. An axis passing through the centers of the first through hole 344 and the second through hole 345 can form a second rotation axis 3562 for the hinge bracket 360 as illustrated in FIG. 11.

In an example configuration, a lock bracket 380 can be coupled to one of the first side wall 365 or the second side wall 366 of the hinge bracket 360 (e.g., coupled to the second side wall 366 as illustrated in FIG. 11). In other example configurations, the lock bracket 380 can be formed as an integral part of the hinge bracket 360. The lock bracket 380 can include a ramp 382 and a recess 384.

Figure 12:
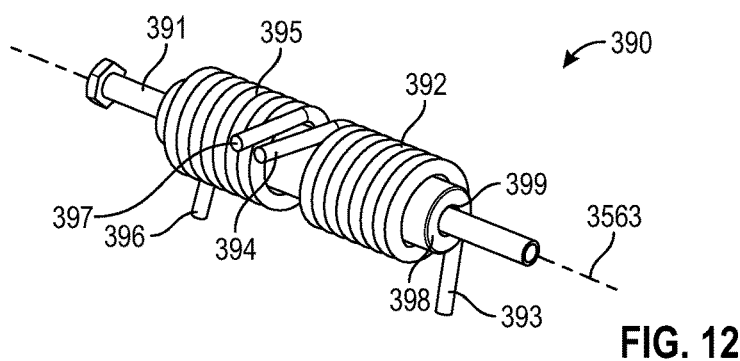
FIG. 12 is an isometric view of an example of a spring assembly.

FIG. 12 is an isometric view of a spring assembly 390 according to an example configuration of the current disclosure. The spring assembly 390 can include one or more torsion springs (e.g., a first torsion spring 392 and a second torsion spring 395). The first torsion spring 392 and the second torsion spring 395 can be made of a known spring wire. The first torsion spring 392 and the second torsion spring 395 can be concentric.

In some example configurations, the spring wire can have a round cross-section or a square cross-section. One or more coils of the spring wire can be wound in circular orientation to form a body of the first torsion spring 392 as illustrated in FIG. 12. The first torsion spring 392 can have a first leg 393 and a second leg 394. The first leg 393 and the second leg 394 of the first torsion spring can extend away from the body of the first torsion spring 392. Similarly, one or more coils of the spring wire can be wound in circular orientation to form a body of the second torsion spring 395. The second torsion spring 395 can have a first leg 396 and a second leg 397. The first leg 396 and the second leg 397 of the second torsion spring 395 can extend away from the body of the second torsion spring 395. In some example configurations, the first leg 393 of the first torsion spring 392 and the first leg 396 of the second torsion spring 395 can be parallel to each other, and the second leg 394 of the first torsion spring 392 and the second leg 397 of the second torsion spring 395 can be parallel to each other.

The spring assembly 390 can further include a mandrel 398. The mandrel 398 can have a circular cross-section, and the mandrel 398 can have a through hole 399 proximate to its center. The mandrel 398 can be at least partially located inside the first torsion spring 392 and the second torsion spring 395. In some example configurations, a mechanical fastener 391 (e.g., a screw, a rivet, or the like) can be inserted through the through hole 399 located at the center of the mandrel 398 to form a third rotation axis 3563 for the spring assembly 390 as illustrated in FIG. 12.

Figure 13:
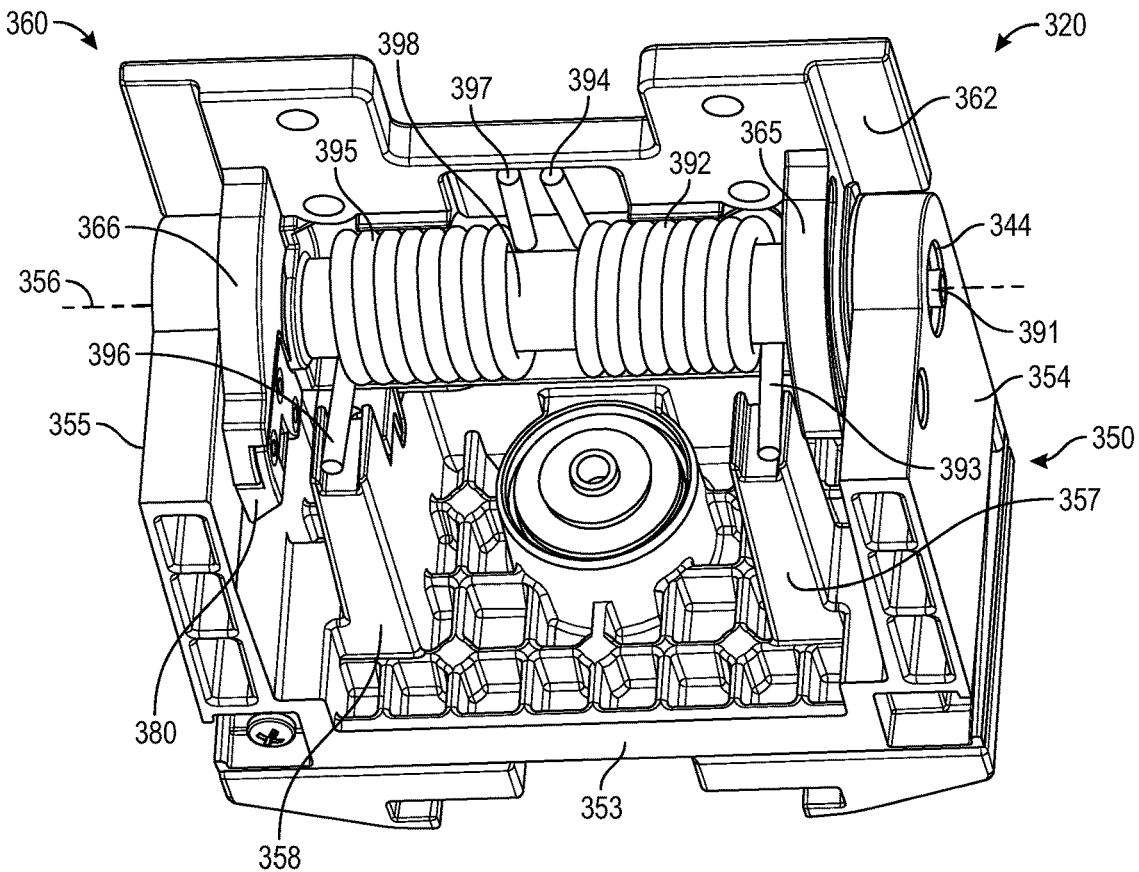
FIG. 13 is a bottom isometric view of an example of the interface assembly of FIG. 9 in extended orientation.

FIG. 13 is an isometric view of the interface assembly 320 according to an example configuration of the current disclosure. In the interface assembly 320, the hinge bracket 360 can be located between the first side wall 354 and second side wall 355 of the carrier block 350, and the spring assembly 390 can be located between the first side wall 365 and the second side wall 366 of the hinge bracket 360. The first rotation axis 3561, the second rotation axis 3562, and the third rotation axis 3563 can coincide with each other to form the horizontal rotation axis 356 (shown in FIG. 8). In an example configuration, the first leg 393 of the first torsion spring 392 can rest against the first spacer 357, and the second leg 394 of the first torsion spring 392 can rest against the flat portion 362 of the hinge bracket 360, similarly, the first leg 396 of the second torsion spring 395 can rest against the second spacer 358 and the second leg 397 of the second torsion spring 395 can rest against the flat portion 362 of the hinge bracket 360. The second leg 394 of the first torsion spring 392 and the second leg 397 of the second torsion spring 395 can apply a force on to the flat portion 362 to bias the hinge bracket 360 towards the extended orientation (shown on FIG. 9). Since the platform 210 is coupled to the hinge bracket 360, the first torsion spring 392 and the second torsion spring 395 can bias the platform 210 to rotate in a clockwise direction towards the stowed orientation shown in FIG. 6.

Figure 14:
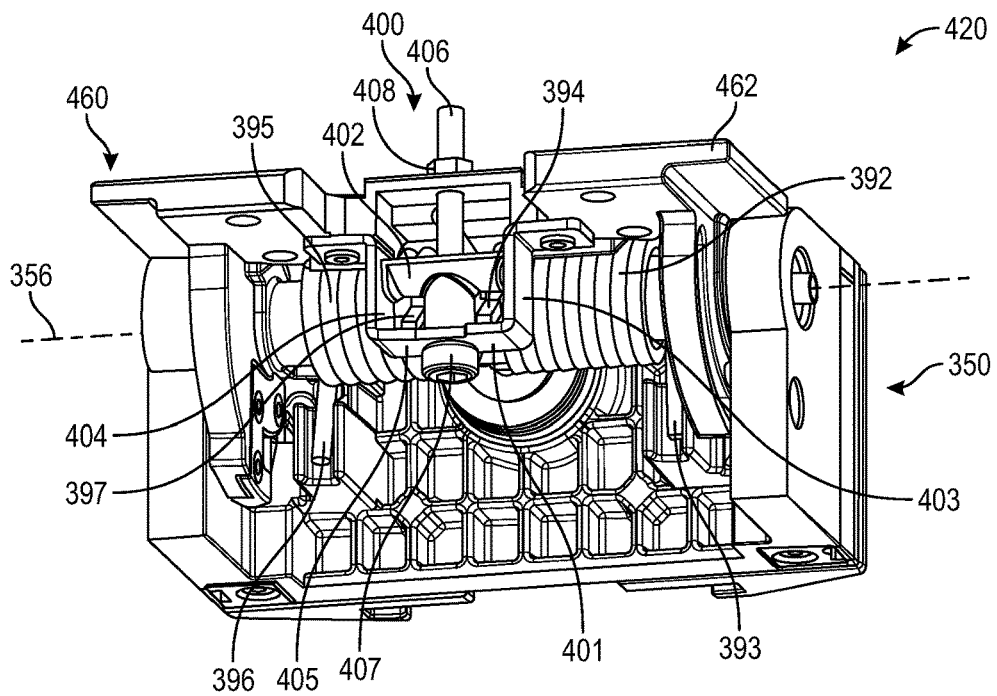
FIG. 14 is a bottom isometric view of another example of the interface assembly of FIG. 9 in extended orientation.

FIG. 14 is an isometric view of an interface assembly 420 according to another example configuration of the current disclosure. The interface assembly 420 can include a carrier block 350 and a hinge bracket 460. The hinge bracket 460 can be rotatingly coupled to the carrier block 350 around a horizontal rotation axis 356 as discussed earlier in association with the FIG. 13.

The hinge bracket 460 can include a flat portion 462. In some example configurations, an adjustment assembly 400 can be coupled to the hinge bracket 460. The adjustment assembly 400 can include a holding bracket 401 and an adjustment bracket 402. The holding bracket 401 can be formed in a U-shaped configuration having a first side 403, a second side 404 and a base 405. The holding bracket 401 can be coupled to the flat portion 462 of the hinge bracket 460. The base 405 of the holding bracket 401 can be parallel to the flat portion 462 of the hinge bracket 460.

The adjustment bracket 402 can be located between the first side 403 and the second side 404 of the holding bracket 401. The adjustment bracket 402 can translate relative to the holding bracket 401 in a path perpendicular to the base 405. An adjustment screw 406 can be coupled to the base 405 of the holding bracket 401 and coupled to the flat portion 462 of the hinge bracket 460. The adjustment screw can be perpendicular to the base 405. The adjustment screw 406 can be rotatingly coupled to the holding bracket 401. The adjustment screw 406 can have a screw head 407. The screw head 407 can be located proximate to the base 405. A nut 408 can be fixedly attached to the adjustment screw 406 proximate to the hinge bracket 460 as illustrated in FIG. 14. The screw head 407 and the nut 408 can prevent the adjustment screw 406 from translating perpendicular to the base 405.

A threaded hole can be formed on the adjustment bracket 402. The threaded hole can be concentric with the adjustment screw 406. The adjustment screw 406 can be at least partially located inside the threaded hole located on the adjustment bracket 402, and the adjustment screw 406 can be threadingly engaged with the adjustment bracket 402. The adjustment bracket 402 can be adapted to translate along the longitudinal direction of the adjustment screw 406 when the adjustment screw 406 is rotated.

In an example configuration, the second leg 394 of the first torsion spring 392 and the second leg 397 of the second torsion spring 395 can rest against the adjustment bracket 402, as illustrated in FIG. 14. Translating the adjustment bracket 402 by turning the adjustment screw 406 can change an angle between the first leg and the second leg of the first torsion spring 392 and the second torsion spring 395 (e.g., change an angle between the first leg 393 and the second leg 394 of the first torsion spring 392). The angle between the first leg and the second leg of the torsion springs can be related to the spring tension.

Manipulating the adjustment assembly 400 (e.g., turning the adjustment screw 406), a user of the workstation 100 can selectively adjust a tension of the first torsion spring 392 and the second torsion spring 395 (e.g., turning the adjustment screw 406 in clockwise direction can increase the tension and turning the adjustment screw 406 in counterclockwise direction can decrease the tension). Increased tension of the torsion spring can apply an increased torque to the hinge bracket 360 in clockwise direction to counter a weight of the platform 210 (e.g., increase the tension of the torsion springs to counter heavier platform weights or decrease the tension of the torsion springs to counter lighter platform weights).

Figure 15:
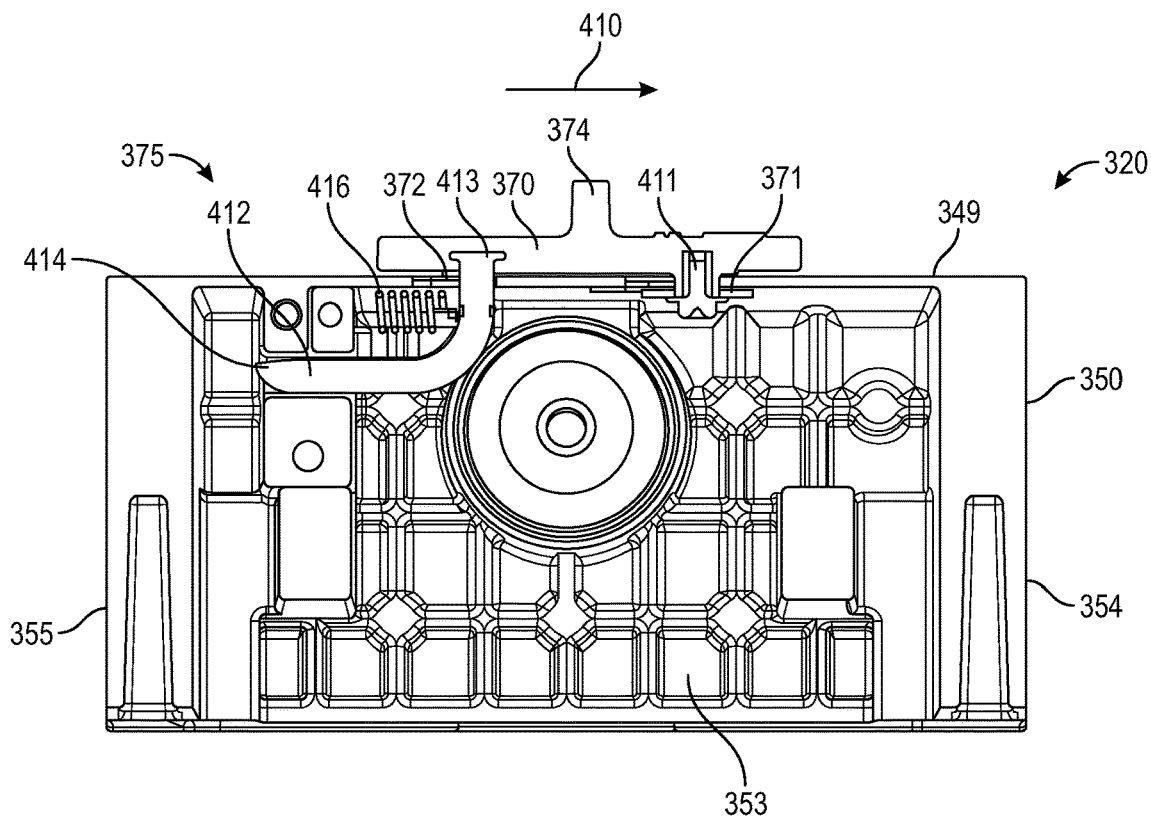
FIG. 15 is a cross-sectional view of the interface assembly of FIG. 9 in an unlocked configuration.
Figure 16:
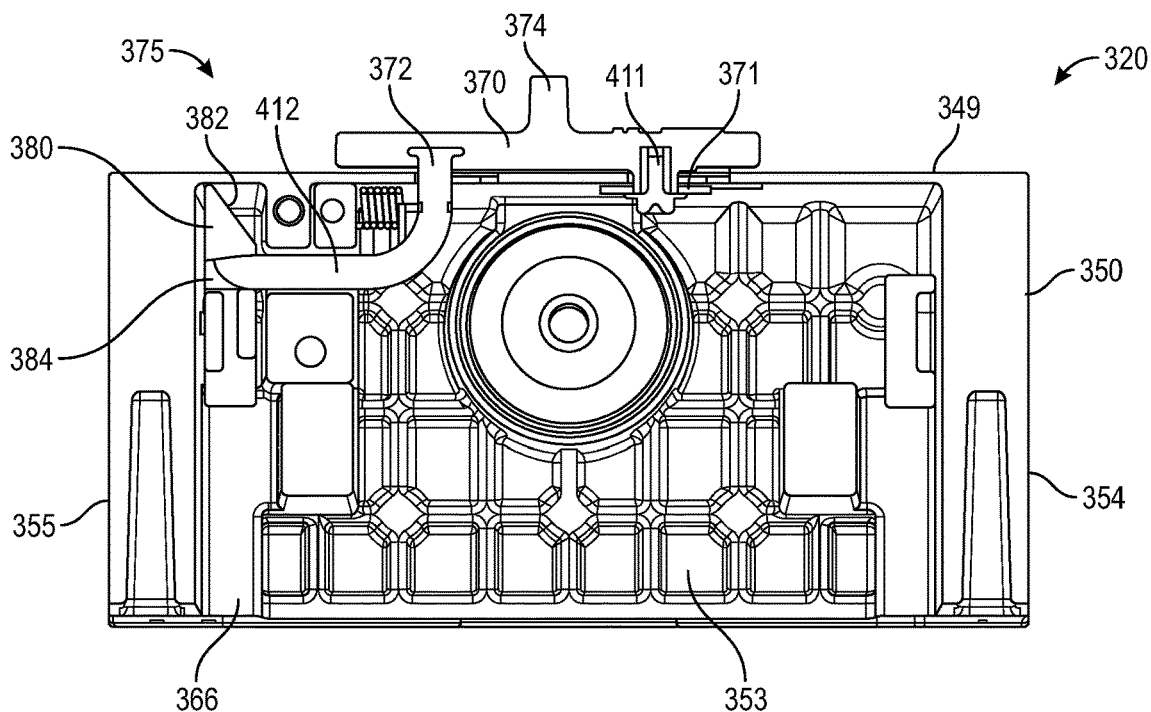
FIG. 16 is a cross-sectional view of the interface assembly of FIG. 9 in a locked configuration.

FIGS. 15-16 are cross-sectional views of the interface assembly 320 of FIG. 9. Front section of the interface assembly 320 is removed to make the internal components visible. The interface assembly 320 can include a carrier block 350 and a hinge bracket 360 as illustrated in FIG. 9. The carrier block can have a rear wall 353, an upper surface 349, a first side wall 354, and a second side wall 355 as illustrated in FIG. 10. A first aperture 371 and a second aperture 372 can be formed on the upper surface 349. The first aperture 371 and the second aperture 372 can be elongated in a first direction 410. The first direction 410 can be perpendicular to the second side wall 355 and points away from the second side wall 355 as illustrated in FIG. 15.

In some example configurations, the interface assembly can include a lock assembly 375. The lock assembly 375 can further include a slider 370. The slider 370 can be located proximate to the upper surface 349. A mechanical fastener 411 (e.g., a screw, a pin, or the like) can be inserted through the first aperture 371 and coupled to the slider 370. A lock pin 412 can be inserted through the second aperture 372 and coupled to the slider 370. The slider 370 can translate relative to the carrier block 350 in parallel to the first direction 410. The mechanical fastener 411 and the lock pin 412 inserted through the first aperture 371 and the second aperture 372, respectively, can guide the slider 370 through its translation relative to the carrier block 350.

In some example configurations, the lock pin 412 can be formed in an L-shape as illustrated in FIG. 15. The lock pin 412 can have a first end 413 and a second end 414. The first end 413 of the lock pin 412 can be coupled to the slider 370 and the second end 414 of the lock pin 412 can be elongated parallel to the first direction 410 (e.g., elongated perpendicular to the second side wall 355). The second end 414 of the lock pin 412 can be formed in a profile (e.g., rounded, tapered, or the like).

The interface assembly 320 can further include an energy storage member 416 (e.g., a tension spring, torsion spring, compression spring, or the like). The energy storage member 416 can be coupled between the lock pin 412 and the carrier block 350. The energy storage member 416 can bias the slider 370 in a second direction opposite the first direction 410.

In the interface assembly 320, the second side wall 366 of the hinge bracket 360 can be adjacent to the second side wall 355 of the carrier block 350. A lock bracket 380 having a ramp 382 and a recess 384 can be coupled to the second side wall 366 of the hinge bracket 360 as illustrated in FIG. 11. The ramp 382 and the recess 384 can translate in an arcuate path in front of the 414 as the hinge bracket 360 rotates around the horizontal rotation axis 356 relative to the carrier block 350.

The hinge bracket 360, and thus, the lock bracket 380 can be rotatingly coupled with the carrier block 350. As the hinge bracket 360 rotates from the extended orientation (shown in FIG. 9) to the folded orientation (shown in FIG. 8), the ramp 382 can contact the second end 414 of the lock pin 412 at a first angle of rotation (e.g., 80 degrees of rotation from the extended orientation, or the like). As the lock bracket 380 continue rotating together with the hinge bracket 360, the ramp 382 can push the lock pin 412 and the slider 370 in the first direction 410 by stretching the energy storage member 416. When the hinge bracket 360 can be placed in the folded orientation at a second angle of rotation (e.g., 90 degrees of rotation from the extended orientation, or the like), the recess 384 can coincide with the second end 414 of the lock pin 412. In the folded orientation, the energy storage member 416 can pull the lock pin 412 and the slider 370 in the second direction opposite the first direction 410 such that the second end 414 of the lock pin 412 can be inserted into the recess 384 to lock the hinge bracket 360 in the folded orientation as illustrated in FIG. 16.

In some example configurations, the slider 370 can have a tab 374. A user of the workstation 100 can interact with the tab 374 to push the slider 370 and the lock pin 412 in the first direction 410 to unlock the hinge bracket 360 (e.g., the second end 414 can move away from the recess 384 to disengage from the lock bracket 380 as illustrated in FIG. 15). Once the lock bracket 380 is unlocked, the user of the workstation 100 can rotate the hinge bracket 360 from folded orientation to the extended orientation to put the platform 210 into a stowed orientation as illustrated in FIG. 6. The one or more energy storage members (e.g., the first torsion spring 392 and the second torsion spring 395, or the like) can provide lift assist to reduce the amount of force that can be exerted by the user to rotate the platform 210 from extended orientation to the stowed orientation.

In some example configurations, the one or more energy storage members (e.g., the first torsion spring 392 and the second torsion spring 395) can have enough tension to counter the weight of the platform 210 and automatically rotate the platform 210 at least part of the way from the extended orientation towards the stowed orientation when the lock pin 412 is disengaged from the lock bracket 380. The one or more torsion springs can apply a force on to the hinge bracket 360 to rotate it from folded orientation towards the extended orientation. When the user of the workstation 100 unlocks the hinge bracket 360 (e.g., pushes the slider 370 in the first direction 410 to disengage the lock pin 412 from the lock bracket 380 by removing the second end 414 of the lock pin 412 from the recess 384), the force applied to the hinge bracket 360 by the one or more torsion springs can rotate the hinge bracket 360 automatically to a third angle of rotation (e.g., 85 degrees of rotation from the extended orientation, or the like). This initial automatic rotation can indicate to the user that the hinge bracket 360 is unlocked and the platform 210 is ready to be rotated to the stowed orientation.

Figure 17:
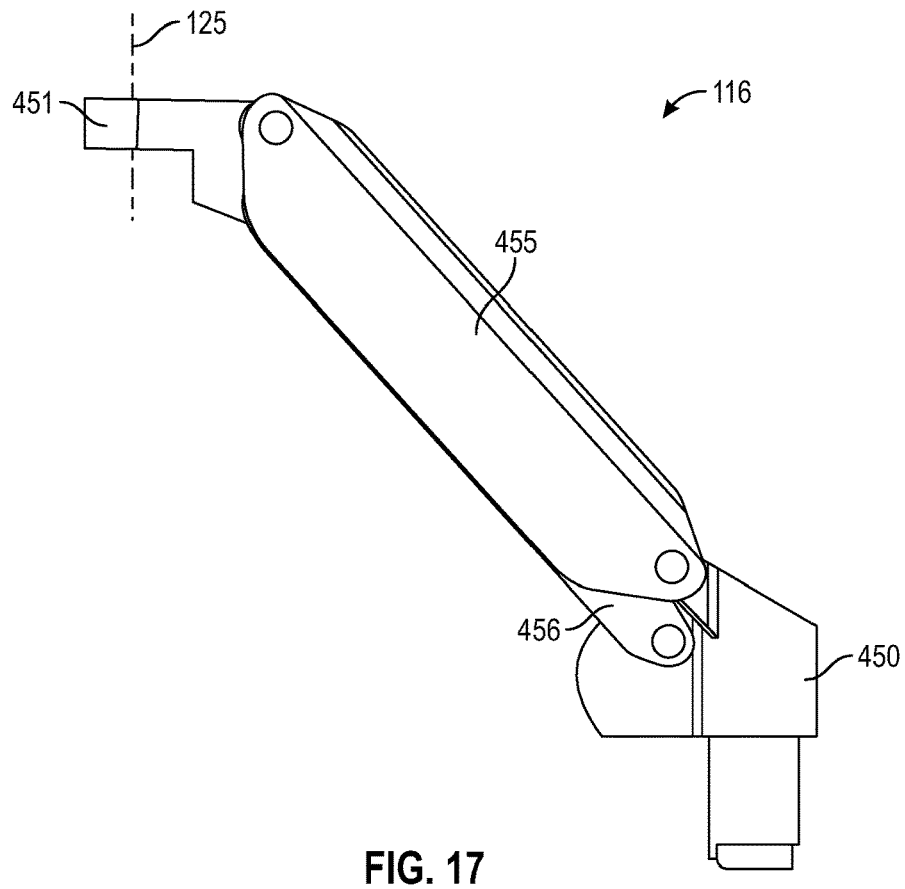
FIG. 17 is a side view of the second arm of FIG. 1.

FIG. 17 is a side view of the second arm 116 of FIG. 1. The second arm 116 can include a first block 450, a second block 451, an upper link arm 455 and a lower link arm 456. The upper link arm 455 can be rotatingly coupled to the first block 450 on one end and rotatingly coupled to the second block 451 on the other end. The lower link arm 456 can be rotatingly coupled to the first block 450 on one end and rotatingly coupled to the second block 451 on the other end. The upper link arm 455 and the lower link arm 456 can be parallel to each other to form a parallel linkage mechanism. The upper link arm 455 and the lower link arm 456 can rotate relative to the first block 450 to adjust a vertical distance between the first block 450 and the second block 451. The upper link arm 455 and the lower link arm 456 can stay parallel during the adjustment to keep the second block 451 leveled at any position.

In some example configurations, the first block 450 can be used to mount the second arm 116 to a structure (e.g., mount to the first arm 114, mount to the structure interface 112, or the like). One or more components (e.g., the platform 210, the display interface 118, or the like) can be coupled to the second block 451. The second arm 116 can be configured to translate the one or more components relative to the first block 450 when the upper link arm 455 and lower link arm 456 rotate relative to the 450.

Figure 18:
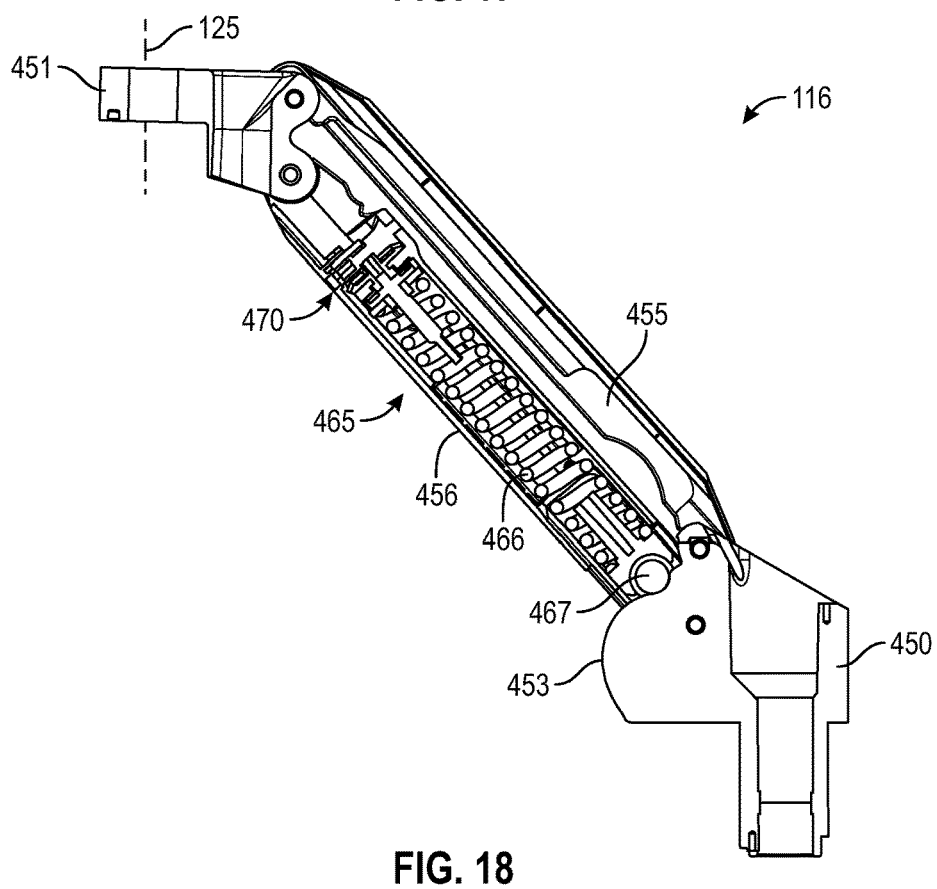
FIG. 18 is a cross-sectional side view of the second arm of FIG. 17.

FIG. 18 is a cross-sectional view of the second arm of FIG. 17. In some example configurations, the second arm 116 can include an arm counterbalance mechanism 465 to provide lift assist during the height adjustment. The arm counterbalance mechanism 465 can provide a lift force to counter at least a portion of the combined weight (e.g., combined weight of the platform 210, electronic display 105, or the like) attached to the second arm 116.

The arm counterbalance mechanism 465 can include an energy storage member 466 (e.g., a compression spring, or the like). The energy storage member 466 can be coupled to the lower link arm 456. The energy storage member 466 can have a first end and a second end. A cam follower 467 can be coupled to the first end of the energy storage member 466, and a tension adjustment assembly 470 can be coupled to the second end of the energy storage member 466. The cam follower 467 can be in contact with a cam 453 formed on the first block 450 throughout the rotation of the lower link arm 456 relative to the first block 450.

Figure 19:
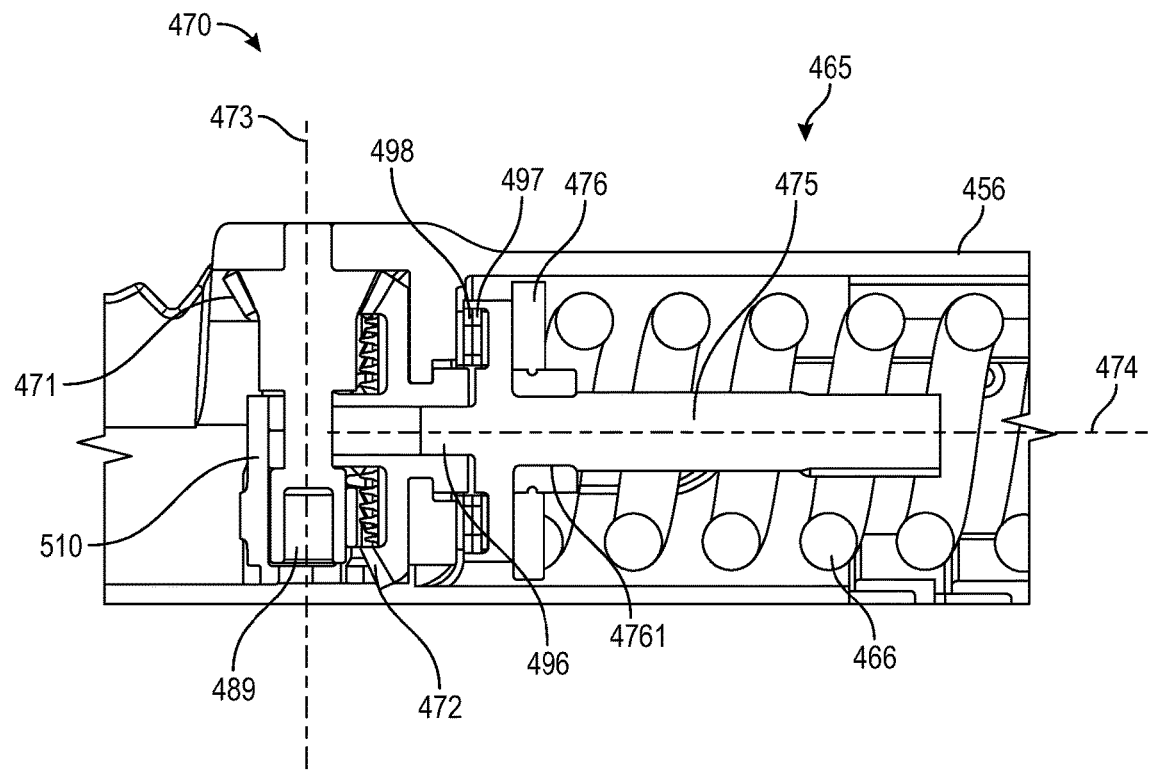
FIG. 19 is an enlarged cross-sectional view of an example of the tension adjustment assembly of FIG. 18.

FIG. 19 is an enlarged cross-sectional view of the tension adjustment assembly 470 of FIG. 18. The tension adjustment assembly 470 can be coupled to the lower link arm 456. The tension adjustment assembly 470 can include a first bevel gear 471 and a second bevel gear 472. The first bevel gear 471 can rotate around a first axis 473, and the second bevel gear can rotate around a second axis 474. The second axis 474 can be perpendicular to the first axis 473. The second bevel gear 472 can engage (e.g., interlock, join, contact, or the like) with the first bevel gear 471 such that a rotation of the first bevel gear 471 can cause a rotation of the second bevel gear 472.

The tension adjustment assembly 470 can also include an adjustment screw 475 and an adjustment bracket 476. The adjustment screw 475 can be concentric with the second bevel gear 472. The adjustment screw 475 can be coupled to the second bevel gear 472 such that the adjustment screw 475 can be adapted to rotate together with the second bevel gear 472 in unison around the second axis 474.

The adjustment bracket 476 can have a threaded hole 4761 proximate to its center. The adjustment screw 475 can be at least partially located inside the threaded hole. The adjustment screw 475 can be threadingly engaged with the adjustment bracket 476. The adjustment bracket 476 can be configured to translate along the axial direction of the adjustment screw 475 (e.g., along the second axis 474) as the adjustment screw 475 is rotated. The second end of the energy storage member 466 can be coupled to (e.g., presses against, or the like) the adjustment bracket 476 as illustrated in FIG. 19. The adjustment bracket 476 can be configured to change a tension (or compression) of the energy storage member 466 as the adjustment bracket translates along the second axis 474.

An elevation of the second block 451 relative to the first block 450 can be changed between a raised position and a lowered position by rotating the lower link arm 456 relative to the first block 450. The energy storage member 466 can bias the second block 451 towards the raised position. During the rotation of the second arm 116, the cam follower 467 can follow a cam profile of the cam 453 to further increase the tension (or compression) of the energy storage member 466. The cam profile of the cam 453 can be configured such that the lift force provided by the arm counterbalance mechanism 465 can be substantially constant throughout the rotation of the lower link arm 456 despite the increased tension (or compression) of the energy storage member 466.

Figure 20:
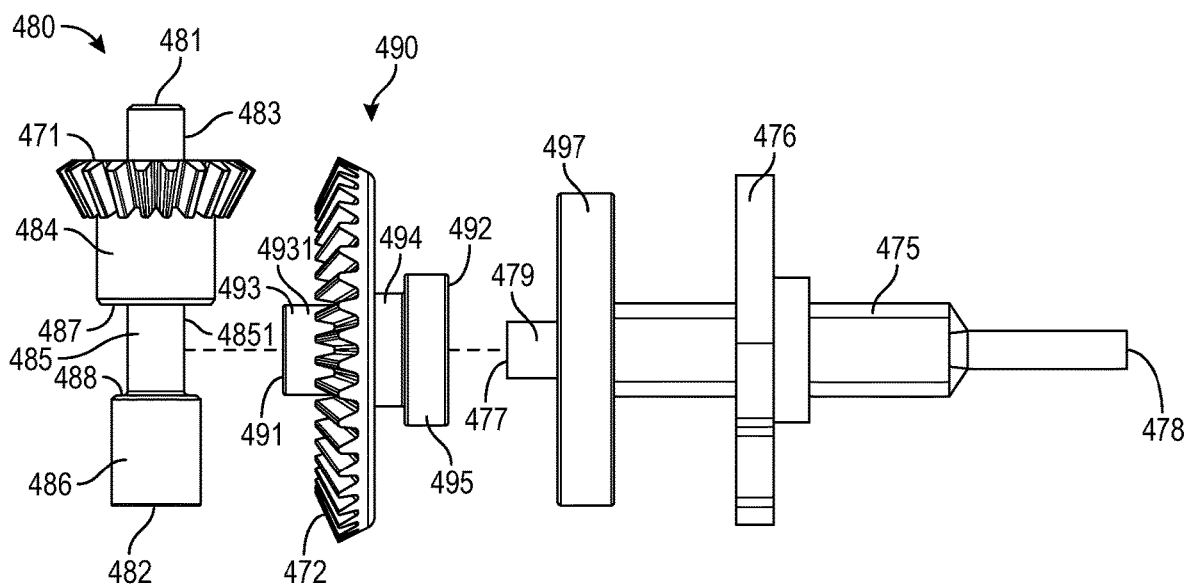
FIG. 20 is an exploded view of the tension adjustment assembly of FIG. 19.

FIG. 20 is an exploded view of the tension adjustment assembly 470 according to an example configuration of the current disclosure. The first bevel gear 471 can be formed on a first bevel gear shaft 480 and the second bevel gear 472 can be formed on a second bevel gear shaft 490. The first bevel gear shaft 480 can cooperate with the second bevel gear shaft 490 to drive the adjustment screw 475 which then translates the adjustment bracket 476 along the second axis 474 to increase the tension of the energy storage member 466.

The first bevel gear shaft 480 can have a first end 481 and a second end 482 opposite the first end 481. The first bevel gear 471 can be formed on the first bevel gear shaft 480 proximate to the first end 481. In some configurations, the first bevel gear 471 can be formed as an integral part of the first bevel gear shaft 480. In other configurations, the first bevel gear 471 can be formed separately and fixedly attached to the first bevel gear shaft 480 during assembly.

The first bevel gear shaft 480 can be formed in four sections including a first section 483, a second section 484, a third section 485, and a fourth section 486. The first section 483 can extend from the first bevel gear 471 in one direction towards the first end 481. The first section 483 can be formed in a circular cross-section, and it can have a first diameter. The second section 484 can extend from the first bevel gear 471 in the other direction towards the second end 482. The third section 485 can extend from the second section 484 towards the second end 482, and the fourth section 486 can extend from the third section 485 towards the second end 482. The second section 484, the third section 485, and the fourth section 486 can be formed in circular cross-sections, and they can have a second diameter, a third diameter, and a fourth diameter, respectively. The third diameter of the third section 485 can be smaller than the second diameter of the second section 484 and the fourth diameter of the fourth section 486. A first face 487 can be formed at the intersection between the second section 484 and the third section 485, and a second face 488 can be formed at the intersection between the third section 485 and the fourth section 486. The first face 487 and the second face 488 can extend from the third section in transverse direction. The third section 485 can have a length 4851 between the first face 487 and the second face 488. A hexagonal shaped recess 489 (shown in FIG. 19) can be formed at the second end 482 of the first bevel gear shaft 480.

The second bevel gear shaft 490 can have a first end 491 and a second end 492. The second bevel gear 472 can be formed on the second bevel gear shaft 490 proximate to the first end 491. In some configurations, the second bevel gear 472 can be formed as an integral part of the second bevel gear shaft 490. In other configurations, the second bevel gear 472 can be formed separately and fixedly attached to the second bevel gear shaft 490 during assembly.

The second bevel gear shaft 490 can be formed in three sections including a first section 493, a second section 494, and a third section 495. The first section 493 can extend from the second bevel gear 472 in one direction towards the first end 491. The first section 493 can be formed in a circular cross-section, and it can have a first diameter 4931. The second section 494 can extend from the second bevel gear 472 in the other direction towards the second end 492. The third section 495 can extend from the second section 494 towards the second end 492. The second section 494, and the third section 495 can be formed in circular cross-sections, and they can have a second diameter, and a third diameter, respectively. The third diameter of the third section 495 can be larger than the second diameter of the second section 494. A recess 496 (shown in FIG. 19) can be formed at the second end 492 of the second bevel gear shaft 490. The recess 496 can have any cross-section including, but not limited to, hexagonal, square, or the like.

In some example configurations, the length 4851 of the third section 485 of the first bevel gear shaft 480 can be configured to receive the first diameter 4931 of the first section 493 of the second bevel gear shaft 490.

The adjustment screw 475 can have a first end 477 and a second end 478 opposite the first end 477. A boss 479 can be formed at the first end 477. A cross-section of the boss 479 can be formed in any shape including, but not limited to, hexagonal, square, or the like. The cross-section of the boss 479 can match the cross-section of the recess 496 located on the second bevel gear shaft 490. In some configurations, the boss 479 can be inserted into the hexagonal shaped recess 496 to couple the adjustment screw 475 with the second bevel gear shaft 490 such that the adjustment screw 475 can be configured to rotate together with the second bevel gear shaft 490.

The adjustment screw 475 can extend from the boss 479 towards the second end to form a threaded shaft. An adjustment bracket 476 can threadingly engage with the adjustment screw 475 over the threaded shaft. The adjustment screw 475 can be flattened proximate to the second end 478 to help limit the adjustment bracket 476 from accidentally disengaging from the adjustment screw 475.

The first section 493 of the second bevel gear shaft 490 can be located proximate the third section 485 of the first bevel gear shaft 480. The length 4851 of the third section 485 can be configured (e.g., the length 4851 can be larger than the first diameter 4931 of the first section 493) such that the first section 493 can be received between the first face 487 and the second face 488. The first face 487 and the second face 488 can prevent the second bevel gear shaft 490 from translating in a direction parallel to the first axis 473.

Going back to FIG. 20, a hub 497 can be coupled to the adjustment screw 475 proximate to the first end 477. The hub 497 can house one or more thrust washers 498 shown in FIG. 19. In some configurations, the hub 497 can be formed as an integral part of the adjustment screw 475, or in other configurations, the hub 497 can be formed separately and coupled to the adjustment screw 475 during assembly.

Figure 21:
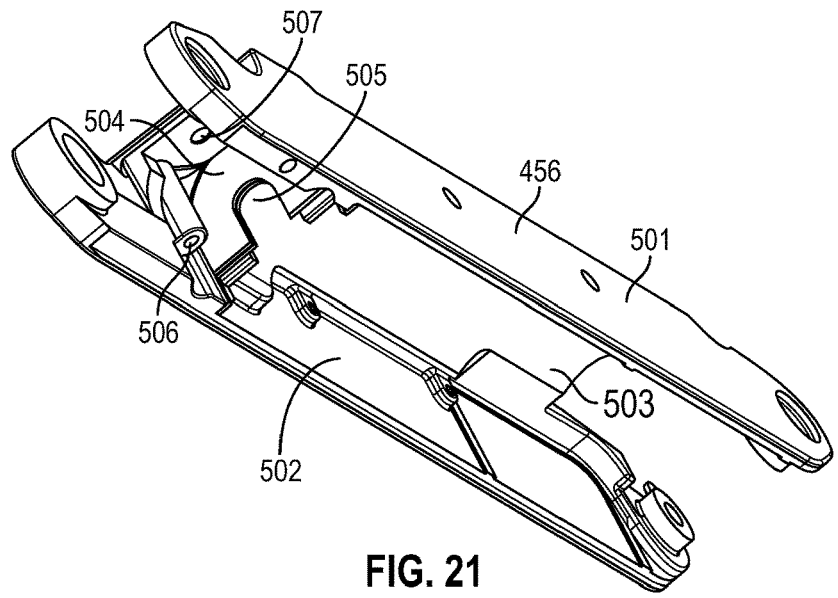
FIG. 21 is a bottom isometric view of an example of the lower link arm of FIG. 17.

FIG. 21 is a bottom isometric view of the lower link arm 456 according to an example configuration of the current disclosure. The lower link arm 456 can be formed in a U-shaped cross-section having a first side wall 501, a second side wall 502 opposite the first side wall 501 and a bottom wall 503. The bottom wall 503 can be coupled to the first side wall 501 and the second side wall 502. In some configurations, an internal wall 504 can be formed proximate to an end of the lower link arm 456. The internal wall 504 can extend from the bottom wall 503 and it can be coupled to the first side wall 501 and the second side wall 502. The internal wall 504 can extend in transverse direction from the bottom wall 503 through at least a portion of the height of the first side wall 501 and the second side wall 502. A circular opening 505 can be formed on the internal wall 504 proximate to its center. A radius of the circular opening can match the radius of the second section 494 of the second bevel gear shaft 490.

The lower link arm 456 can further include one or more bosses 506 and an aperture 507. The aperture 507 can be formed on the bottom wall 503 proximate to the internal wall 504. The one or more bosses 506 and the aperture 507 can be used to couple the tension adjustment assembly 470 to the lower link arm 456.

Figure 22:
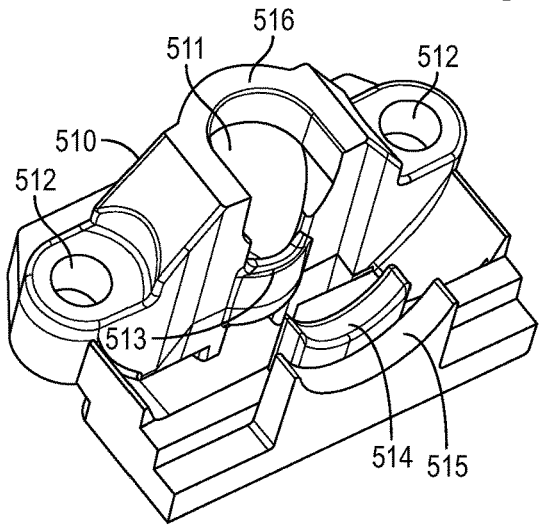
FIG. 22 is an isometric view of an example of a housing of FIG. 19.

FIG. 22 is a housing 510 according to an example configuration of the current disclosure. The housing 510 can be coupled to the lower link arm 456 and it can be configured to hold the first bevel gear shaft 480 and the second bevel gear shaft 490. The housing 510 can have a center opening 511 and one or more through holes 512 located on the side of the center opening 511. The diameter of the center opening 511 can be configured to receive at least the fourth section 486 of the first bevel gear shaft 480.

The housing 510 can further include a first flange 513, a second flange 514, and a third flange 515 as illustrated in FIG. 22. The first flange 513 can be adjacent to the center opening 511. A portion of the wall of the center opening 511 can be removed above the first flange 513. The second flange 514 can be located away from the first flange 513. The distance between the first flange 513 and the second flange 514 can be configured to receive the second bevel gear 472. The third flange 515 can be adjacent to the second flange 514.

In some example configurations, the first flange 513, the second flange 514, and the third flange 515 can have concave round profiles at their respective upper ends. A radius of the concave profile on the first flange 513 can match the radius of the first section 493 of the second bevel gear shaft 490. A radius of the concave profile on the second flange 514 can match the radius of the second section 494 of the second bevel gear shaft 490. A radius of the concave profile on the third flange 515 can match the radius of the third section 495 of the second bevel gear shaft 490.

Figure 23:
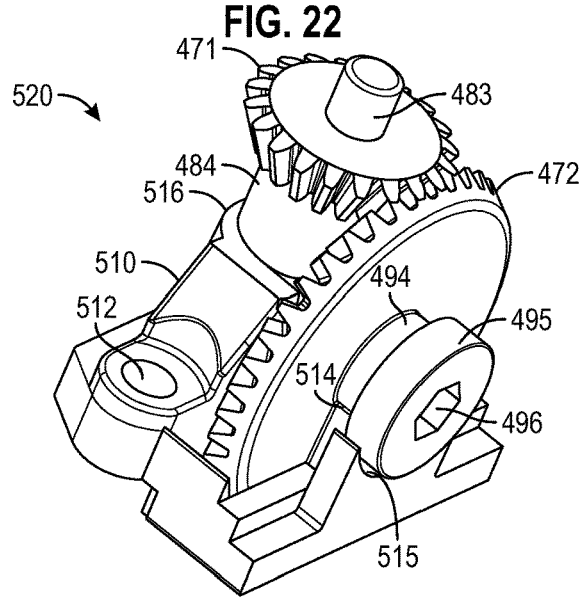
FIG. 23 is an isometric view of a gear assembly according to an example configuration of the current disclosure.

FIG. 23 is an isometric view of a gear assembly 520 according to an example configuration of the current disclosure. The gear assembly 520 can include the housing 510, the first bevel gear shaft 480 having the first bevel gear 471 and the second bevel gear shaft 490 having the second bevel gear 472. The third section 485 and the fourth section 486 of the first bevel gear shaft 480 can be inserted into the center opening 511 of the housing 510. The second section 484 can extend outside the housing 510. In some configurations, the first face 487 can be seated over an upper end 516 of the housing 510.

The second bevel gear shaft 490 can be inserted into the housing 510 such that the second bevel gear 472 can be located between the first flange 513 and the second flange 514. The first section 493 of the second bevel gear shaft 490 can be seated over the first flange 513, the second section 494 of the second bevel gear shaft 490 can be seated over the second flange 514, and the third section 495 of the second bevel gear shaft 490 can be seated over the third flange 515.

The gear assembly 520 of FIG. 23 can be coupled to the lower link arm 456. The first section 483 of the first bevel gear shaft 480 can be inserted into the aperture 507, and the one or more through holes 512 can overlap with the one or more bosses 506. One or more mechanical fasteners (e.g., screws, pins, or the like) can be inserted through the one or more through holes 512 and threadingly engage with the one or more bosses 506 to secure the housing to the lower link arm 456. During the attachment of the gear assembly 520 to the lower link arm 456, the internal wall 504 can be inserted between the second bevel gear 472 and the third section 495 of the second bevel gear shaft 490. The circular opening 505 can be seated over the second section 494 of the second bevel gear shaft 490 to trap it between the circular opening 505 and the second flange 514.

Going back to FIG. 19, a tool (e.g., a hex wrench, or the like) can be inserted into the hexagonal shaped recess 489 to engage with the first bevel gear shaft 480. The tool can be manipulated (e.g., rotated, or the like) to rotate the first bevel gear 471 and the second bevel gear 472, and thus, to rotate the adjustment screw 475. A rotation of the adjustment screw 475 can translate the adjustment bracket 476 to adjust the tension of the energy storage member 466 as discussed above.

Each of these non-limiting examples can stand on its own or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

Additional Notes and Aspects

Aspect 1 may include or use subject matter (such as an apparatus, a system, a device, a method, a means for performing acts, or a device readable medium including instructions that, when performed by the device, may cause the device to perform acts), such as may include or use a workstation support assembly comprising: an arm assembly having a first end rotatingly coupled to a structure and a second end; and a mount assembly comprising: a keyboard support assembly adapted to support a keyboard; and a display support assembly adapted to support an electronic display over the keyboard support assembly, the display support assembly rotatingly coupled with the arm assembly about a vertical axis proximate the second end; wherein the arm assembly is configured to translate the mount assembly relative to the structure.

Aspect 2 may include or use, or may optionally be combined with the subject matter of Aspect 1, to optionally include or use, wherein the arm assembly comprises a first arm and a second arm, wherein the first arm is rotatingly coupled to the structure on one end and rotatingly coupled to the second arm on an opposite end of the first arm, wherein the second arm is rotatingly coupled to the first arm on one end and rotatingly coupled to the mount assembly on an opposite end of the second arm, wherein the first arm and the second arm are configured to cooperate to translate the mount assembly in a horizontal direction relative to the structure, and wherein the second arm is configured to translate the mount assembly in a vertical direction relative to the structure.

Aspect 3 may include or use, or may optionally be combined with the subject matter of Aspect 2, to optionally include or use, wherein the second arm comprises: a first block coupled to the first arm; a second bock coupled to the mount assembly; a first link arm rotatingly coupled to the first block on one end and rotatingly coupled to the second block on an opposite end; and a second link arm rotatingly coupled to the first block on one end and rotatingly coupled to the second block on an opposite end; wherein the first block, the second block, the first link arm, and the second link arm are configured to cooperate to translate the mount assembly in a vertical direction relative to the structure.

Aspect 4 may include or use, or may optionally be combined with the subject matter of Aspect 3, to optionally include or use, wherein the second arm comprises a counterbalance mechanism, wherein the counterbalance mechanism is configured to generate a lift force to counter a weight of the mount assembly.

Aspect 5 may include or use, or may optionally be combined with the subject matter of Aspect 4, to optionally include or use, wherein the counterbalance mechanism comprises: a cam having a cam profile; wherein the cam is coupled to the first block, an energy storage member having an energy storage member first end and an energy storage member second end; a cam follower coupled to the energy storage member first end; and an adjustment assembly coupled to the energy storage member second end; wherein the energy storage member, the cam follower, and the adjustment assembly are coupled to a lower link arm, wherein the cam follower is adapted to move over the cam profile as the second link arm rotates relative to the second block, and wherein the adjustment assembly is configured to change a tension of the energy storage member.

Aspect 6 may include or use, or may optionally be combined with the subject matter of Aspect 5, to optionally include or use, wherein the adjustment assembly comprises: a first gear shaft having a first bevel gear; wherein the first gear shaft and the first bevel gear are configured to rotate about a first axis; a second gear shaft having a second bevel gear, wherein the second gear shaft and the second bevel gear are configured to rotate about a second axis, wherein the second axis is perpendicular to the first axis, and an adjustment screw coupled to the second gear shaft, wherein the adjustment screw is coaxial with the second gear shaft at the second axis, and wherein the first bevel gear cooperates with the second bevel gear to rotate the adjustment screw about the second axis.

Aspect 7 may include or use, or may optionally be combined with the subject matter of Aspect 6, to optionally include or use, wherein the first gear shaft is elongated between a first gear shaft first end and a first gear shaft second end, wherein the first bevel gear is coupled to the first gear shaft proximate the first gear shaft first end, the first gear shaft further comprises a recessed section between the first gear shaft first end and the first gear shaft second end, wherein the recessed section is formed in a round cross-section having a first length between a first face and a second face, wherein the first face and the second face extend from the recessed section in transverse direction.

Aspect 8 may include or use, or may optionally be combined with the subject matter of Aspect 7, to optionally include or use, wherein the second gear shaft is elongated between a second gear shaft first end and a second gear shaft second end, wherein the second bevel gear is coupled to the second gear shaft proximate the second gear shaft first end, wherein the second gear shaft has a first diameter at the second gear shaft first end, wherein the first diameter is smaller than the first length, wherein the second gear shaft first end is configured to be inserted into the recessed section of the first gear shaft between the first face and the second face, wherein the first face and the second face are configured to prevent the second gear shaft to move in a direction parallel to the first axis, and wherein the adjustment screw is coupled to the second gear shaft.

Aspect 9 may include or use, or may optionally be combined with the subject matter of Aspect 8, to optionally include or use, wherein the adjustment assembly comprises an adjustment bracket having a threaded hole at its center, wherein the adjustment bracket is threadingly engaged with the adjustment screw at the threaded hole, wherein the energy storage member second end is coupled to the adjustment bracket, and wherein the adjustment bracket is configured to translate along the adjustment screw as the adjustment screw is rotated to change the tension of the energy storage member.

Aspect 10 may include or use, or may optionally be combined with the subject matter of Aspect 1, to optionally include or use, wherein the keyboard support assembly comprises: a support tray, and an interface assembly, wherein the interface assembly is coupled between the support tray and the arm assembly, and wherein the support tray is configured to rotate around a horizontal axis relative to the interface assembly between a use orientation where the support tray is substantially horizontal and a stowed orientation where the support tray is substantially vertical.

Aspect 11 may include or use, or may optionally be combined with the subject matter of Aspect 10, to optionally include or use, wherein the interface assembly comprises: an interface bracket configured to be coupled to the arm assembly; a carrier block; and a hinge bracket configured to be coupled to the support tray; wherein the carrier block is coupled to the interface bracket on one end and coupled to the hinge bracket on an opposite end; wherein the hinge bracket is configured to rotate around the horizontal axis between a folded orientation where the hinge bracket is substantially vertical and an extended orientation where hinge bracket is substantially horizontal; and wherein the folded orientation of the hinge bracket corresponds to the use orientation of the support tray and the extended orientation of the hinge bracket corresponds to the stowed orientation of the support tray.

Aspect 12 may include or use, or may optionally be combined with the subject matter of Aspect 11, to optionally include or use, wherein the interface assembly comprises a spring assembly having one or more torsion springs, the one or more torsion springs include a first leg and a second leg, wherein the first leg is coupled to the carrier block, and the second leg is coupled to the hinge bracket, and wherein the one or more torsion springs biases the hinge bracket towards the extended orientation.

Aspect 13 may include or use, or may optionally be combined with the subject matter of Aspect 12, to optionally include or use, wherein the interface assembly comprises a torsion spring adjustment assembly, wherein the torsion spring adjustment assembly is coupled to the hinge bracket, the torsion spring adjustment assembly includes: a holding bracket coupled to the hinge bracket; a torsion spring adjustment bracket; and a torsion spring adjustment screw coupled between the holding bracket and the hinge bracket, wherein the torsion spring adjustment screw is threadingly engaged with the torsion spring adjustment bracket, wherein the second legs of the one or more torsion springs are coupled to the torsion spring adjustment bracket, and wherein a rotation of the torsion spring adjustment screw translates the torsion spring adjustment bracket to change a tension of the one or more torsion springs.

Aspect 14 may include or use, or may optionally be combined with the subject matter of Aspect 12, to optionally include or use, wherein the interface assembly comprises a lock assembly including: a slider slidingly engaged with the carrier block; a lock pin coupled to the slider; and a spring coupled between the slider and the carrier block; wherein the slider translates between a locked configuration and an unlocked configuration relative to the carrier block, wherein the lock pin is configured to engage with the hinge bracket in the locked configuration when the support tray is in the use orientation, and disengage from the hinge bracket in the unlocked configuration allowing the support tray to be rotated to the stowed orientation, and wherein the spring is configured to bias the lock assembly towards the locked configuration.

Aspect 15 may include or use, or may optionally be combined with the subject matter of Aspect 14, to optionally include or use, wherein the spring assembly is configured to automatically rotate the support tray a first angle from the use orientation towards the stowed orientation when the lock assembly is put in the unlocked configuration, and wherein the first angle is less than a full rotation angle between the use orientation and the stowed orientation.

Aspect 16 may include or use, or may optionally be combined with the subject matter of Aspect 11, to optionally include or use, wherein the carrier block is rotatingly coupled to the interface bracket to level the support tray relative to the structure.

Aspect 17 may include or use subject matter (such as an apparatus, a system, a device, a method, a means for performing acts, or a device readable medium including instructions that, when performed by the device, may cause the device to perform acts), such as may include or use a workstation support assembly comprising: a mount assembly comprising: a keyboard support adapted to support a keyboard; and a display support adapted to support an electronic display over the keyboard support an arm assembly configured to translate the mount assembly relative to a structure, the arm assembly including a counterbalance mechanism configured to generate a lift force to counter a weight of the mount assembly, the counterbalance mechanism comprising: an energy storage member; a cam defining a cam profile and a cam follower coupled to the energy storage member, the cam follower adapted to move over the cam profile as the second arm rotates; and an adjustment assembly coupled to the energy storage member, the adjustment assembly configured to adjust a tension of the energy storage member, the adjustment assembly comprising: an adjustment screw; a first gear shaft including a first bevel gear, the first gear shaft and the first bevel gear together configured to rotate about a first axis; and a second gear shaft including a second bevel gear, the second gear shaft and the second bevel gear configured to rotate about a second axis that is perpendicular to the first axis, the second gear shaft coupled to, and coaxial with, the adjustment screw, the first bevel gear configured to cooperate with the second bevel gear to rotate the adjustment screw about the second axis to adjust the tension of the energy storage member.

Aspect 18 may include or use, or may optionally be combined with the subject matter of Aspect 17, to optionally include or use, wherein the first gear shaft is elongated between a first gear shaft first end and a first gear shaft second end, wherein the first bevel gear is coupled to the first gear shaft proximate the first gear shaft first end, the first gear shaft further comprises a recessed section between the first gear shaft first end and the first gear shaft second end, wherein the recessed section is formed in a round cross-section having a first length between a first face and a second face, wherein the first face and the second face project from the recessed section in transverse direction.

Aspect 19 may include or use, or may optionally be combined with the subject matter of Aspect 18, to optionally include or use, wherein the second gear shaft is elongated between a second gear shaft first end and a second gear shaft second end, wherein the second bevel gear is coupled to the second gear shaft proximate the second gear shaft first end, the second gear shaft has a first diameter at the second gear shaft first end, wherein the first diameter is smaller than the first length, wherein the second gear shaft first end is configured to be inserted into the recessed section of the first gear shaft between the first face and the second face, wherein the first face and the second face are configured to prevent the second gear shaft to move in a direction parallel to the first axis, and wherein the adjustment screw is coupled to the second gear shaft.

Aspect 20 may include or use subject matter (such as an apparatus, a system, a device, a method, a means for performing acts, or a device readable medium including instructions that, when performed by the device, may cause the device to perform acts), such as may include or use a workstation support assembly comprising: an arm assembly having a first end rotatingly coupled to a structure and a second end; and a mount assembly coupled to the second end, the mount assembly comprising: a display support adapted to support an electronic display; and a keyboard support adapted to support a keyboard, the keyboard support comprising: a support tray; and an interface assembly comprising: a carrier block configured to be coupled to the arm assembly; a hinge bracket coupled to the support tray and coupled to the carrier block, wherein the hinge bracket is configured to rotate about a horizontal axis relative to the carrier block; a spring assembly having one or more torsion springs, the one or more torsion springs include a first leg coupled to the carrier block, and a second leg coupled to the hinge bracket; and a lock assembly including: a lock pin; a slider coupled to the lock pin, wherein the slider translates between a locked configuration and an unlocked configuration relative to the carrier block; and a spring coupled between the slider and the carrier block, wherein the spring is configured to bias the slider towards the locked configuration; wherein the support tray is configured to rotate around the horizontal axis relative to the carrier block between a use orientation where the support tray is substantially horizontal and a stowed orientation where the support tray is substantially vertical; wherein the lock pin is configured to engage with the hinge bracket in the locked configuration when the support tray is in the use orientation, and disengage from the hinge bracket in the unlocked configuration allowing the support tray to be rotated to the stowed orientation; and wherein the spring assembly is configured to automatically rotate the support tray a first angle from the use orientation towards the stowed orientation in the unlocked configuration, wherein the first angle is less than a full rotation angle between the use orientation and the stowed orientation.

Each of these non-limiting examples can stand on its own or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The claimed invention is:
1. A workstation support assembly comprising:
an arm assembly having a first end rotatingly coupled to a structure and a second end; and
a mount assembly comprising:
a keyboard support assembly adapted to support a keyboard; and
a display support assembly adapted to support an electronic display over the keyboard support assembly, the display support assembly rotatably coupled with the arm assembly about a vertical axis proximate the second end;
wherein the arm assembly is configured to translate the mount assembly relative to the structure, the arm assembly comprising:
a first arm comprising:
a first end rotatably coupled to the structure; and
a second end opposite the first end; and
a second arm comprising:
a first end rotatably coupled to the second end of the first arm;
a second end opposite the first end, the second end rotatably coupled to the mount assembly;
a first block coupled to the first arm;
a second block coupled to the mount assembly;
a first link arm comprising:
a first end rotatably coupled to the first block; and
a second end opposite the first end and rotatably coupled to the second block;
a second link arm comprising:
a first end rotatably coupled to the first block; and
a second end opposite the first end and rotatably coupled to the second block; and
a counterbalance mechanism configured to generate a lift force to counter a weight of the mount assembly, the counterbalance mechanism comprising:
a cam having a cam profile, the cam coupled to the first block;
an energy storage member including:
a first end;
a second end;
a cam follower coupled to the first end of the energy storage member and adapted to move over the cam profile as the second link arm rotates relative to the second block; and
an adjustment assembly coupled to the second end of the energy storage member and configured to change a tension of the energy storage member;
the energy storage member, the cam follower, and the adjustment assembly are coupled to a lower link arm;
the first block, the second block, the first link arm, and the second link arm are configured to cooperate to translate the mount assembly in a vertical direction relative to the structure; and
the first arm and the second arm are configured to cooperate to translate the mount assembly in a horizontal direction relative to the structure and the second arm is configured to translate the mount assembly in a vertical direction relative to the structure.

2. The workstation support assembly of claim 1, wherein the adjustment assembly comprises:
a first gear shaft having a first bevel gear; wherein the first gear shaft and the first bevel gear are configured to rotate about a first axis;
a second gear shaft having a second bevel gear, wherein the second gear shaft and the second bevel gear are configured to rotate about a second axis, wherein the second axis is perpendicular to the first axis, and
an adjustment screw coupled to the second gear shaft, wherein the adjustment screw is coaxial with the second gear shaft at the second axis, and
wherein the first bevel gear cooperates with the second bevel gear to rotate the adjustment screw about the second axis.

3. The workstation support assembly of claim 2, wherein the first gear shaft is elongated between a first gear shaft first end and a first gear shaft second end, wherein the first bevel gear is coupled to the first gear shaft proximate the first gear shaft first end, the first gear shaft further comprises a recessed section between the first gear shaft first end and the first gear shaft second end, wherein the recessed section is formed in a round cross-section having a first length between a first face and a second face, wherein the first face and the second face extend from the recessed section in transverse direction.

4. The workstation support assembly of claim 3, wherein the second gear shaft is elongated between a second gear shaft first end and a second gear shaft second end,
wherein the second bevel gear is coupled to the second gear shaft proximate the second gear shaft first end,
wherein the second gear shaft has a first diameter at the second gear shaft first end, wherein the first diameter is smaller than the first length,
wherein the second gear shaft first end is configured to be inserted into the recessed section of the first gear shaft between the first face and the second face,
wherein the first face and the second face are configured to prevent the second gear shaft to move in a direction parallel to the first axis, and
wherein the adjustment screw is coupled to the second gear shaft.

5. The workstation support assembly of claim 4, wherein the adjustment assembly comprises an adjustment bracket having a threaded hole at its center,
wherein the adjustment bracket is threadingly engaged with the adjustment screw at the threaded hole,
wherein the energy storage member second end is coupled to the adjustment bracket, and
wherein the adjustment bracket is configured to translate along the adjustment screw as the adjustment screw is rotated to change the tension of the energy storage member.

6. A workstation support assembly comprising:
an arm assembly having a first end rotatably coupled to a structure and a second end; and
a mount assembly, the arm assembly configured to translate the mount assembly relative to the structure, the mount assembly comprising:
a keyboard support assembly adapted to support a keyboard, the keyboard support assembly comprising:
a support tray; and
an interface assembly coupled between the support tray and the arm assembly, the support tray configured to rotate around a horizontal axis relative to the interface assembly between a use orientation wherein the support tray is substantially horizontal and a stowed orientation where the support tray is substantially vertical, wherein the interface assembly comprises:
an interface bracket configured to be coupled to an arm assembly;
a carrier block; and
a hinge bracket configured to be coupled to the support tray; and
a display support assembly adapted to support an electronic display over the keyboard support assembly, the display support assembly rotatably coupled with the arm assembly about a vertical axis proximate the second end;

wherein the carrier block is coupled to the interface bracket on one end and coupled to the hinge bracket on an opposite end;

wherein the hinge bracket is configured to rotate around the horizontal axis between a folded orientation wherein the hinge bracket is substantially vertical and an extended orientation where the hinge bracket is substantially horizontal; and wherein the folded orientation of the hinge bracket corresponds to the use orientation of the support tray and the extended orientation of the hinge bracket corresponds to the stowed orientation of the support tray.

7. The workstation support assembly of claim 6, wherein the interface assembly comprises a spring assembly having one or more torsion springs, the one or more torsion springs include a first leg and a second leg;

wherein the first leg is coupled to the carrier block, and the second leg is coupled to the hinge bracket; and wherein the one or more torsion springs bias the hinge bracket towards the extended orientation.

8. The workstation support assembly of claim 7, wherein the interface assembly comprises a torsion spring adjustment assembly coupled to the hinge bracket, wherein the torsion spring adjustment assembly includes:

a holding bracket coupled to the hinge bracket;

a torsion spring adjustment bracket; and a torsion spring adjustment screw coupled between the holding bracket and the hinge bracket, the torsion spring adjustment screw threadedly engaged with the hinge bracket;

wherein the second leg of the one or more torsion springs are coupled to the hinge bracket; and wherein a rotation of the torsion spring adjustment screw translates the hinge bracket to change a tension of the one or more torsion springs.

9. The workstation support assembly of claim 8, wherein the interface assembly comprises:

a lock assembly comprising:

a slider slidingly engaged with the carrier block;

a lock pin coupled to the slider; and a spring coupled between the slider and the carrier block;

wherein the slider translates between a locked configuration and an unlocked configuration relative to the carrier block;

wherein the lock pin is configured to engage with the hinge bracket in the locked configuration when the support tray is in the use orientation and disengage from the hinge bracket in the unlocked configuration allowing the support tray to be rotated to the stowed orientation; and wherein the spring is configured to bias the lock assembly toward the locked configuration.

10. The workstation support assembly of claim 9, wherein the spring assembly is configured to automatically rotate the support tray a first angle from the use orientation towards the stowed orientation when the lock assembly is put in the unlocked configuration, and wherein the first angle is less than a full rotation angle between the use orientation and the stowed orientation.

11. The workstation support assembly of claim 10, wherein the carrier block is rotatably coupled to the interface bracket to level the support tray relative to the structure.

* * * * *